US012389184B2

(12) United States Patent
Hatanaka et al.

(10) Patent No.: US 12,389,184 B2
(45) Date of Patent: Aug. 12, 2025

(54) INFORMATION PROCESSING APPARATUS AND INFORMATION PROCESSING METHOD

(71) Applicant: SONY GROUP CORPORATION, Tokyo (JP)

(72) Inventors: Mitsuyuki Hatanaka, Tokyo (JP); Toru Chinen, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/758,153

(22) PCT Filed: Dec. 25, 2020

(86) PCT No.: PCT/JP2020/048715
§ 371 (c)(1),
(2) Date: Jun. 29, 2022

(87) PCT Pub. No.: WO2021/140951
PCT Pub. Date: Jul. 15, 2021

(65) Prior Publication Data

US 2022/0377488 A1 Nov. 24, 2022

(30) Foreign Application Priority Data

Jan. 9, 2020 (JP) ................................ 2020-002148
Jun. 3, 2020 (JP) ................................ 2020-097068

(51) Int. Cl.
*H04S 7/00* (2006.01)

(52) U.S. Cl.
CPC ........... *H04S 7/303* (2013.01); *H04S 2400/11* (2013.01); *H04S 2400/13* (2013.01)

(58) Field of Classification Search
CPC ... H04S 7/303; H04S 2400/11; H04S 2400/13
See application file for complete search history.

(56) References Cited

U.S. PATENT DOCUMENTS 9,756,449 B2 9/2017 Van Der Wijst
2014/0270182 A1 9/2014 Vilermo
(Continued)

FOREIGN PATENT DOCUMENTS

CN 1499485 A 5/2004
CN 109983786 A 7/2019
(Continued)

OTHER PUBLICATIONS

International Search Report and Written Opinion of PCT Application No. PCT/JP2020/048715, issued on Mar. 23, 2021, 09 pages of ISRWO.

*Primary Examiner* — Jason R Kurr
(74) *Attorney, Agent, or Firm* — CHIP LAW GROUP

(57) ABSTRACT

The present technology relates to an information processing apparatus and an information processing method, and a program capable of realizing content reproduction based on an intention of a content creator. An information processing apparatus includes: a listener position information acquisition unit that acquires listener position information of a viewpoint of a listener; a reference viewpoint information acquisition unit that acquires position information of a first reference viewpoint and object position information of an object at the first reference viewpoint, and position information of a second reference viewpoint and object position information of the object at the second reference viewpoint; and an object position calculation unit that calculates position information of the object at the viewpoint of the listener on the basis of the listener position information, the position information of the first reference viewpoint and the object position information at the first reference viewpoint, and the position information of the second reference viewpoint and the object position information at the second reference
(Continued)

viewpoint. The present technology can be applied to content reproduction systems.

18 Claims, 20 Drawing Sheets

(56) References Cited

U.S. PATENT DOCUMENTS

| | | | | |
|---|---|---|---|---|
| 2017/0280264 | A1* | 9/2017 | Wang | H04S 7/308 |
| 2018/0098173 | A1* | 4/2018 | van Brandenburg | G10L 19/008 |
| 2019/0160377 | A1 | 5/2019 | Masuda | |
| 2019/0230435 | A1 | 7/2019 | Maeno | |
| 2021/0006925 | A1* | 1/2021 | Munoz | H04S 7/303 |
| 2021/0029487 | A1* | 1/2021 | De Muynke | H04S 7/305 |

FOREIGN PATENT DOCUMENTS

| | | | |
|---|---|---|---|
| CN | 109996166 | A | 7/2019 |
| CN | 110447071 | A | 11/2019 |
| EP | 3002960 | A1 | 4/2016 |
| EP | 3547718 | A1 | 10/2019 |
| JP | 2000-106700 | A | 4/2000 |
| JP | 2019-146160 | A | 8/2019 |
| KR | 20170039520 | A | 4/2017 |
| KR | 20180107308 | A | 10/2018 |
| WO | WO-2015107926 | A1 | 7/2015 |
| WO | WO-2016084592 | A1 | 6/2016 |
| WO | 2017/010313 | A1 | 1/2017 |
| WO | 2018/096954 | A1 | 5/2018 |
| WO | 2019198540 | A1 | 10/2019 |
| WO | WO-2019187442 | A1 | 10/2019 |

* cited by examiner

FIG. 4

| syntax | |
|---|---|
| fva_structure_info_polar() { | |
| **NumOfObjs;** | NUMBER OF OBJECTS |
| **NumfOfRefViewPoint;** | NUMBER OF REFERENCE VIEWPOINTS |
| for (i = 0; i < NumfOfRefViewPoint; i++) { | |
| **RefViewX[i];** | ASSUMED ABSOLUTE COORDINATE POSITION OF REFERENCE VIEWPOINT (X AXIS) |
| **RefViewY[i];** | ASSUMED ABSOLUTE COORDINATE POSITION OF REFERENCE VIEWPOINT (Y AXIS) |
| **RefViewZ[i];** | ASSUMED ABSOLUTE COORDINATE POSITION OF REFERENCE VIEWPOINT (Z AXIS) |
| **ListenerYaw[i];** | ASSUMED DIRECTION OF FACE OF LISTENER AT EACH REFERENCE VIEWPOINT POSITION (YAW DIRECTION) |
| **ListenerPitch[i];** | ASSUMED DIRECTION OF FACE OF LISTENER AT EACH REFERENCE VIEWPOINT POSITION (PITCH DIRECTION) |
| } | |
| for (i = 0; i < NumOfObjs; i++) { | |
| **ObjectOverLapMode[i];** | REPRODUCTION MODE IN CASE WHERE LISTENER AND OBJECT OVERLAP |
| } | |
| } | |

FIG. 5

| | |
|---|---|
| syntax | |
| fva_structure_info_cartesian() { | |
| **NumOfObjs**; | NUMBER OF OBJECTS |
| **NumfOfRefViewPoint**; | NUMBER OF REFERENCE VIEWPOINTS |
| for (i = 0; i < NumfOfRefViewPoint; i++) { | |
| **RefViewX[i]**; | ASSUMED ABSOLUTE COORDINATE POSITION OF REFERENCE VIEWPOINT (X AXIS) |
| **RefViewY[i]**; | ASSUMED ABSOLUTE COORDINATE POSITION OF REFERENCE VIEWPOINT (Y AXIS) |
| **RefViewZ[i]**; | ASSUMED ABSOLUTE COORDINATE POSITION OF REFERENCE VIEWPOINT (Z AXIS) |
| } | |
| for (i = 0; i < NumOfObjs; i++) { | |
| **ObjectOverLapMode[i]**; | REPRODUCTION MODE IN CASE WHERE LISTENER AND OBJECT OVERLAP |
| } | |
| } | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/048715 filed on Dec. 25, 2020, which claims priority benefit of Japanese Patent Application No. JP 2020-002148 filed in the Japan Patent Office on Jan. 9, 2020, which claims priority benefit of Japanese Patent Application No. JP 2020-097068 filed in the Japan Patent Office on Jun. 3, 2020. Each of the above-referenced applications is hereby incorporated herein by reference in its entirety.

TECHNICAL FIELD

The present technology relates to an information processing apparatus, an information processing method, and a program, and more particularly, to an information processing apparatus and an information processing method, and a program capable of realizing content reproduction based on an intention of a content creator.

BACKGROUND ART

For example, in a free viewpoint space, each object arranged in the space using the absolute coordinate system is fixedly arranged (see, for example, Patent Document 1).

In this case, the direction of each object viewed from an arbitrary listening position is uniquely obtained on the basis of the coordinate position of the listener in the absolute space, the face direction, and the relationship to the object, and the gain of each object is uniquely obtained on the basis of the distance from the listening position, and the sound of each object is reproduced.

CITATION LIST

Patent Document

Patent Document 1: WO 2019/198540 A

SUMMARY OF THE INVENTION

Problems to be Solved by the Invention

On the other hand, there are points to be emphasized as content for the artistry and the listener.

For example, there is a case where it is desirable that an object be located forward such as, regarding music content, a musical instrument or a player at a certain listening point where the content is desired to be emphasized in terms of its substance, or regarding sports content, a player who is desired to be emphasized.

In view of the above, there is a possibility that the mere physical relationship between the listener and the object as described above does not sufficiently convey the amusement of the content.

The present technology has been made in view of such a situation and realizes content reproduction based on an intention of a content creator while following a free position of a listener.

Solutions to Problems

An information processing apparatus according to an aspect of the present technology includes: a listener position information acquisition unit that acquires listener position information of a viewpoint of a listener; a reference viewpoint information acquisition unit that acquires position information of a first reference viewpoint and object position information of an object at the first reference viewpoint, and position information of a second reference viewpoint and object position information of the object at the second reference viewpoint; and an object position calculation unit that calculates position information of the object at the viewpoint of the listener on the basis of the listener position information, the position information of the first reference viewpoint and the object position information at the first reference viewpoint, and the position information of the second reference viewpoint and the object position information at the second reference viewpoint.

An information processing method or program according to an aspect of the present technology includes the steps of: acquiring listener position information of a viewpoint of a listener; acquiring position information of a first reference viewpoint and object position information of an object at the first reference viewpoint, and position information of a second reference viewpoint and object position information of the object at the second reference viewpoint; and calculating position information of the object at the viewpoint of the listener on the basis of the listener position information, the position information of the first reference viewpoint and the object position information at the first reference viewpoint, and the position information of the second reference viewpoint and the object position information at the second reference viewpoint.

According to an aspect of the present technology, listener position information of a viewpoint of a listener is acquired; position information of a first reference viewpoint and object position information of an object at the first reference viewpoint, and position information of a second reference viewpoint and object position information of the object at the second reference viewpoint are acquired; and position information of the object at the viewpoint of the listener is calculated on the basis of the listener position information, the position information of the first reference viewpoint and the object position information at the first reference viewpoint, and the position information of the second reference viewpoint and the object position information at the second reference viewpoint.

BRIEF DESCRIPTION OF DRAWINGS

FIG. 4 is a diagram illustrating an example of system configuration information.

FIG. 5 is a diagram illustrating an example of system configuration information.

MODE FOR CARRYING OUT THE INVENTION

An embodiment to which the present technology has been applied is described below with reference to the drawings.

First Embodiment

<Configuration Example of the Content Reproduction System>

The present technology has Features F1 to F6 described below.

(Feature F1)

The feature that object arrangement and gain information at a plurality of reference viewpoints in a free viewpoint space are prepared in advance.

(Feature F2)

The feature that an object position and gain information at an arbitrary listening point are obtained on the basis of object arrangement and gain information at a plurality of reference viewpoints sandwiching or surrounding the arbitrary listening point (listening position).

(Feature F3)

The feature that, in a case where an object position and the gain amount of an arbitrary listening point are obtained, a proportion ratio is obtained according to a plurality of reference viewpoints sandwiching or surrounding the arbitrary listening point and the arbitrary listening point, and the object position with respect to the arbitrary listening point is obtained using the proportion ratio.

(Feature F4)

The feature that object arrangement information at a plurality of reference viewpoints prepared in advance uses a polar coordinate system and is transmitted.

(Feature F5)

The feature that object arrangement information at a plurality of reference viewpoints prepared in advance uses an absolute coordinate system and is transmitted.

(Feature F6)

The feature that, in a case where an object position at an arbitrary listening point is calculated, a listener can listen with the object arrangement brought closer to any reference viewpoint by using a specific bias coefficient.

First, a content reproduction system to which the present technology has been applied will be described.

The content reproduction system includes a server and a client that code, transmit, and decode each piece of data.

For example, the listener position information is transmitted from the client side to the server as necessary, and some object position information is transmitted from the server side to the client side on the basis of the result. Then, rendering processing is performed on each object on the basis of some object position information received on the client side, and content including a sound of each object is reproduced.

Figure 1:
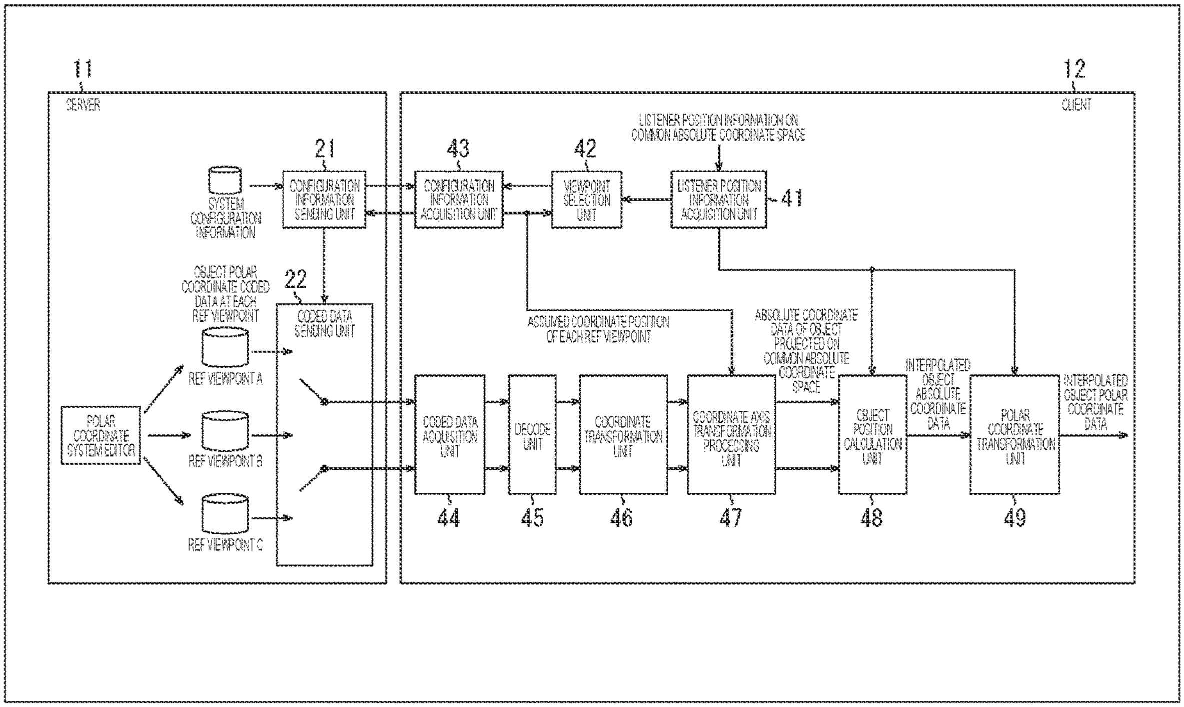
FIG. 1 is a diagram illustrating a configuration of a content reproduction system.

Such content reproduction system is configured as illustrated, for example, in FIG. 1.

That is, the content reproduction system illustrated in FIG. 1 includes a server 11 and a client 12.

The server 11 includes a configuration information sending unit 21 and a coded data sending unit 22.

The configuration information sending unit 21 sends (transmits) system configuration information prepared in advance to the client 12, and receives viewpoint selection information or the like transmitted from the client 12 and supplies the information to the coded data sending unit 22.

In the content reproduction system, a plurality of listening positions on a predetermined common absolute coordinate space is designated (set) in advance by a content creator as the positions of reference viewpoints (hereinafter, also referred to as the reference viewpoint positions).

Here, the content creator designates (sets) in advance, as the reference viewpoint, the position on the common absolute coordinate space that the content creator wants the listener to take as the listening position at the time of content reproduction, and the direction of the face that the content creator wants the listener to face at the position, that is, a viewpoint at which the content creator wants the listener to listen to the sound of the content.

In the server 11, system configuration information that is information regarding each reference viewpoint and object polar coordinate coded data for each reference viewpoint are prepared in advance.

Here, the object polar coordinate coded data for each reference viewpoint is obtained by coding object polar coordinate position information indicating the relative position of the object viewed from the reference viewpoint. In the object polar coordinate position information, the position of the object viewed from the reference viewpoint is expressed by polar coordinates. Note that even for the same object, the absolute arrangement position of the object in the common absolute coordinate space varies with each reference viewpoint.

The configuration information sending unit 21 sends the system configuration information to the client 12 via a network or the like immediately after the operation of the content reproduction system is started, that is, for example, immediately after connection with the client 12 is established.

The coded data sending unit 22 selects two reference viewpoints from among the plurality of reference viewpoints on the basis of the viewpoint selection information supplied from the configuration information sending unit 21, and sends the object polar coordinate coded data of each of the selected two reference viewpoints to the client 12 via a network or the like.

Here, the viewpoint selection information is, for example, information indicating two reference viewpoints selected on the client 12 side.

Therefore, in the coded data sending unit 22, the object polar coordinate coded data of the reference viewpoint requested by the client 12 is acquired and sent to the client 12. Note that the number of reference viewpoints selected by the viewpoint selection information is not limited to two, but may be three or more.

Furthermore, the client 12 includes a listener position information acquisition unit 41, a viewpoint selection unit 42, a configuration information acquisition unit 43, a coded data acquisition unit 44, a decode unit 45, a coordinate transformation unit 46, a coordinate axis transformation processing unit 47, an object position calculation unit 48, and a polar coordinate transformation unit 49.

The listener position information acquisition unit 41 acquires the listener position information indicating the absolute position (listening position) of the listener on the common absolute coordinate space according to the designation operation of the user (listener) or the like, and supplies the listener position information to the viewpoint selection unit 42, the object position calculation unit 48, and the polar coordinate transformation unit 49.

For example, in the listener position information, the position of the listener in the common absolute coordinate space is expressed by absolute coordinates. Note that, hereinafter, the coordinate system of the absolute coordinates indicated by the listener position information is also referred to as a common absolute coordinate system.

The viewpoint selection unit 42 selects two reference viewpoints on the basis of the system configuration information supplied from the configuration information acquisition unit 43 and the listener position information supplied from the listener position information acquisition unit 41, and supplies viewpoint selection information indicating the selection result to the configuration information acquisition unit 43.

For example, the viewpoint selection unit 42 specifies a section from the position of the listener (listening position) and the assumed absolute coordinate position of each reference viewpoint, and selects two reference viewpoints on the basis of the result of specifying the section.

The configuration information acquisition unit 43 receives the system configuration information transmitted from the server 11 and supplies the system configuration information to the viewpoint selection unit 42 and the coordinate axis transformation processing unit 47, and transmits the viewpoint selection information supplied from the viewpoint selection unit 42 to the server 11 via a network or the like.

Note that, here, an example in which the viewpoint selection unit 42 that selects a reference viewpoint on the basis of the listener position information and the system configuration information is provided in the client 12 will be described, but the viewpoint selection unit 42 may be provided on the server 11 side.

The coded data acquisition unit 44 receives the object polar coordinate coded data transmitted from the server 11 and supplies the object polar coordinate coded data to the decode unit 45. That is, the coded data acquisition unit 44 acquires the object polar coordinate coded data from the server 11.

The decode unit 45 decodes the object polar coordinate coded data supplied from the coded data acquisition unit 44, and supplies the resultant object polar coordinate position information to the coordinate transformation unit 46.

The coordinate transformation unit 46 performs coordinate transformation on the object polar coordinate position information supplied from the decode unit 45, and supplies the resultant object absolute coordinate position information to the coordinate axis transformation processing unit 47.

The coordinate transformation unit 46 performs coordinate transformation that transforms polar coordinates into absolute coordinates. Therefore, the object polar coordinate position information that is polar coordinates indicating the position of the object viewed from the reference viewpoint is transformed into object absolute coordinate position information that is absolute coordinates indicating the position of the object in the absolute coordinate system having the position of the reference viewpoint as the origin.

The coordinate axis transformation processing unit 47 performs coordinate axis transformation processing on the object absolute coordinate position information supplied from the coordinate transformation unit 46 on the basis of the system configuration information supplied from the configuration information acquisition unit 43.

Here, the coordinate axis transformation processing is processing performed by combining coordinate transformation (coordinate axis transformation) and offset shift, and the object absolute coordinate position information indicating absolute coordinates of the object projected on the common absolute coordinate space is obtained by the coordinate axis transformation processing. That is, the object absolute coordinate position information obtained by the coordinate axis transformation processing is absolute coordinates of the common absolute coordinate system indicating the absolute position of the object on the common absolute coordinate space.

The object position calculation unit 48 performs interpolation processing on the basis of the listener position information supplied from the listener position information acquisition unit 41 and the object absolute coordinate position information supplied from the coordinate axis transformation processing unit 47, and supplies the resultant final object absolute coordinate position information to the polar coordinate transformation unit 49. The final object absolute coordinate position information mentioned here is information indicating the position of the object in the common absolute coordinate system in a case where the viewpoint of the listener is at the listening position indicated by the listener position information.

The object position calculation unit 48 calculates the absolute position of the object in the common absolute coordinate space corresponding to the listening position, that is, the absolute coordinates of the common absolute coordinate system, from the listening position indicated by the listener position information and the positions of the two reference viewpoints indicated by the viewpoint selection information, and determines the absolute position as the final object absolute coordinate position information. At this time, the object position calculation unit 48 acquires the system configuration information from the configuration information acquisition unit 43 and acquires the viewpoint selection information from the viewpoint selection unit 42 as necessary.

The polar coordinate transformation unit 49 performs polar coordinate transformation on the object absolute coordinate position information supplied from the object position calculation unit 48 on the basis of the listener position information supplied from the listener position information acquisition unit 41, and outputs the resultant polar coordinate position information to a subsequent rendering processing unit, which is not illustrated.

The polar coordinate transformation unit 49 performs polar coordinate transformation of transforming the object absolute coordinate position information, which is absolute coordinates of the common absolute coordinate system, into polar coordinate position information, which is polar coordinates indicating a relative position of the object viewed from the listening position.

Note that, although the example in which the object polar coordinate coded data is prepared in advance for each reference viewpoint in the server 11 has been described above, the object absolute coordinate position information to be the output of the coordinate axis transformation processing unit 47 may be prepared in advance in the server 11.

Figure 2:
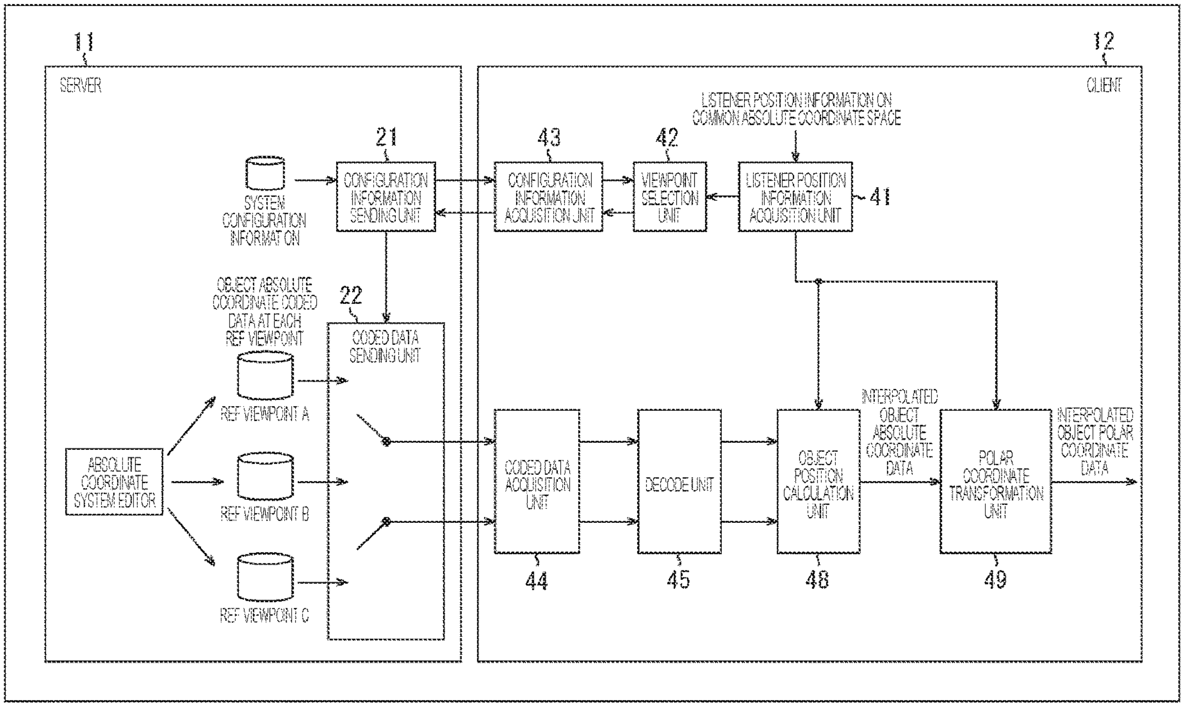
FIG. 2 is a diagram illustrating a configuration of a content reproduction system.

In such a case, the content reproduction system is configured as illustrated, for example, in FIG. 2. Note that portions in FIG. 2 corresponding to those of FIG. 1 are designated by the same reference numerals, and description is omitted as appropriate.

The content reproduction system illustrated in FIG. 2 includes a server 11 and a client 12.

Furthermore, the server 11 includes a configuration information sending unit 21 and a coded data sending unit 22, but in this example, the coded data sending unit 22 acquires object absolute coordinate coded data of two reference viewpoints indicated by viewpoint selection information, and sends the object absolute coordinate coded data to the client 12.

That is, in the server 11, the object absolute coordinate coded data obtained by coding the object absolute coordinate position information to be the output of the coordinate axis transformation processing unit 47 illustrated in FIG. 1 is prepared in advance for each of the plurality of reference viewpoints.

Therefore, in this example, the client 12 is not provided with the coordinate transformation unit 46 or the coordinate axis transformation processing unit 47 illustrated in FIG. 1.

That is, the client 12 illustrated in FIG. 2 includes a listener position information acquisition unit 41, a viewpoint selection unit 42, a configuration information acquisition unit 43, a coded data acquisition unit 44, a decode unit 45, an object position calculation unit 48, and a polar coordinate transformation unit 49.

The configuration of the client 12 illustrated in FIG. 2 is different from the configuration of the client 12 illustrated in FIG. 1 on the point that the coordinate transformation unit 46 and the coordinate axis transformation processing unit 47 are not provided, and is the same as the configuration of the client 12 illustrated in FIG. 1 on the other points.

The coded data acquisition unit 44 receives the object absolute coordinate coded data transmitted from the server 11 and supplies the object absolute coordinate coded data to the decode unit 45.

The decode unit 45 decodes the object absolute coordinate coded data supplied from the coded data acquisition unit 44, and supplies the resultant object absolute coordinate position information to the object position calculation unit 48.

Regarding the Present Technology

Next, the present technology will be further described.

First, a process of creating content provided from the server 11 to the client 12 will be described.

First, an example in which a transmission method using a polar coordinate system is used, that is, an example in which the object polar coordinate coded data is transmitted as illustrated in FIG. 1 will be described.

Content creation using the polar coordinate system is performed for 3D audio based on a fixed viewpoint, and there is an advantage that such a creation method can be used as it is.

A plurality of reference viewpoints at which the content creator (hereinafter, also simply referred to as a creator) wants the listener to listen to is set in the three-dimensional space according to the intention of the creator.

Figure 3:
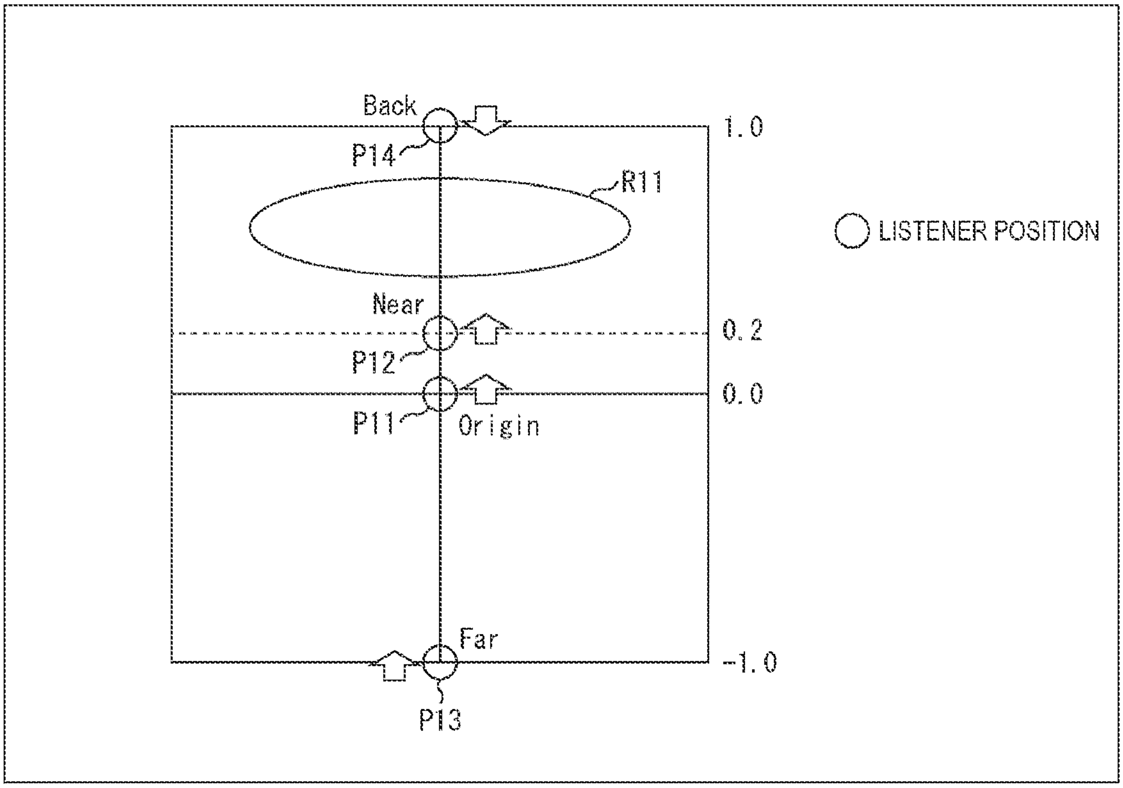
FIG. 3 is a diagram describing a reference viewpoint.

Specifically, for example, as illustrated in FIG. 3, four reference viewpoints are set in a common absolute coordinate space which is a three-dimensional space. Here, four positions P11 to P14 designated by the creator are the reference viewpoints, in more detail, the positions of the reference viewpoints.

The reference viewpoint information, which is information regarding each reference viewpoint, includes reference viewpoint position information, which is absolute coordinates of a common absolute coordinate system indicating a standing position in the common absolute coordinate space, that is, the position of the reference viewpoint, and listener direction information indicating the direction of the face of the listener.

Here, the listener direction information includes, for example, a rotation angle (horizontal angle) in the horizontal direction of the face of the listener at the reference viewpoint and a vertical angle indicating the direction of the face of the listener in the vertical direction.

In FIG. 3, the arrows drawn adjacent to the respective positions P11 to P14 indicate the listener direction information at the reference viewpoint indicated by the respective positions P11 to P14, that is, the direction of the face of the listener.

Furthermore, in FIG. 3, a region R11 indicates an example of a region where an object exists, and it can be seen that, in this example, at each reference viewpoint, the direction of the face of the listener indicated by the listener direction information is the direction of the region R11. For example, at the position P14, the direction of the face of the listener indicated by the listener direction information is backward.

Next, the object polar coordinate position information expressing the position of each object at each of the plurality of set reference viewpoints in a polar coordinate format and the gain amount for each object at each of the reference viewpoints are set by the creator. For example, the object polar coordinate position information includes a horizontal angle and a vertical angle of the object viewed from the reference viewpoint, and a radius indicating a distance from the reference viewpoint to the object.

When the position and the like of the object are set for each of the plurality of reference viewpoints in this manner, Information IFP1 to Information IFP5 described below are obtained as the information regarding the reference viewpoint.

(Information IFP1)

The number of objects (Information IFP2)

The number of reference viewpoints (Information IFP3)

Direction of the face of a listener at a reference viewpoint (horizontal angle and vertical angle)

(Information IFP4)

Absolute coordinate position of a reference viewpoint in an absolute space (common absolute coordinate space)

(Information IFP5)

Polar coordinate position (horizontal angle, vertical angle, and radius) and gain amount of each object viewed from Information IFP3 and Information IFP4

Here, Information IFP3 is the above-described listener direction information and Information IFP4 is the above-described reference viewpoint position information.

Furthermore, the polar coordinate position, which is Information IFP5, includes a horizontal angle, a vertical angle, and a radius, and is the object polar coordinate position information indicating a relative position of the object based on the reference viewpoint. Since the object polar coordinate position information is equivalent to the polar coordinate coded information of Moving Picture Experts Group (MPEG)-H, the coding system of MPEG-H can be utilized.

Information including each piece of information from Information IFP1 to Information IFP4 among Information IFP1 to Information IFP5 is the above-described system configuration information.

This system configuration information is transmitted to the client 12 side prior to transmission of data related to an object, that is, object polar coordinate coded data or coded audio data obtained by coding audio data of an object.

A specific example of the system configuration information is as illustrated, for example, in FIG. 4.

In the example illustrated in FIG. 4, "NumOfObjs" indicates the number of objects, which is the number of objects constituting the content, that is, Information IFP1 described above, and "NumfOfRefViewPoint" indicates the number of reference viewpoints, that is, Information IFP2 described above.

Furthermore, the system configuration information illustrated in FIG. 4 includes the reference viewpoint information corresponding to the number of reference viewpoints "NumfOfRefViewPoint".

That is, "RefViewX[i]", "RefViewY[i]", and "RefViewZ [i]" respectively indicate the X coordinate, the Y coordinate, and the Z coordinate of the common absolute coordinate system indicating the position of the reference viewpoint constituting the reference viewpoint position information of the i-th reference viewpoint as Information IFP4.

Furthermore, "ListenerYaw[i]" and "ListenerPitch[i]" are a horizontal angle (yaw angle) and a vertical angle (pitch angle) constituting the listener direction information of the i-th reference viewpoint as Information IFP3.

Moreover, in this example, the system configuration information includes information "ObjectOverLapMode[i]" indicating a reproduction mode in a case where the positions of the listener and the object overlap with each other for each object, that is, the listener (listening position) and the object are at the same position.

Next, an example in which a transmission method using an absolute coordinate system is used, that is, an example in which object absolute coordinate coded data is transmitted as illustrated in FIG. 2 will be described.

Also in the case of transmitting the object absolute coordinate coded data, similarly to the case of transmitting the object polar coordinate coded data, the object position with respect to each reference viewpoint is recorded as absolute coordinate position information. That is, the object absolute coordinate position information of each object is prepared by the creator for each reference viewpoint.

However, in this example, unlike the example of the transmission method using the polar coordinate system, it is not necessary to transmit the listener direction information indicating the direction of the face of the listener.

In the example using the transmission method using the absolute coordinate system, Information IFA1 to Information IFA4 described below are obtained as the information regarding the reference viewpoint.

(Information IFA1)

The number of objects (Information IFA2)

The number of reference viewpoints (Information IFA3)

Absolute coordinate position of a reference viewpoint in an absolute space (Information IFA4)

Absolute coordinate position and gain amount of each object when the listener is present at the absolute coordinate position indicated in Information IFA3

Here, Information IFA1 and Information IFA2 are the same information as Information IFP1 and Information IFP2 described above, and Information IFA3 is the above-described reference viewpoint position information.

Furthermore, the absolute coordinate position of the object indicated by Information IFA4 is the object absolute coordinate position information indicating the absolute position of the object on the common absolute coordinate space indicated by the absolute coordinates of the common absolute coordinate system Note that, in the transmission of the object absolute coordinate coded data from the server 11 to the client 12, the object absolute coordinate position information indicating the position of the object with accuracy corresponding to the positional relationship between the listener and the object, for example, the distance from the listener to the object, may be generated and transmitted. In this case, the information amount (bit depth) of the object absolute coordinate position information can be reduced without causing a feeling of deviation of the sound image position.

For example, as the distance from the listener to the object is shorter, the object absolute coordinate position information (object absolute coordinate coded data) with higher accuracy, that is, the object absolute coordinate position information indicating a more accurate position is generated.

This is because, although the position of the object is deviated depending on the quantization accuracy (quantization step width) at the time of coding, as the distance from the listener to the object is longer, the magnitude (tolerance) of the position deviation that does not cause a feeling of deviation of the localization position of the sound image is larger.

Specifically, for example, the object absolute coordinate coded data obtained by coding the object absolute coordinate position information with the highest accuracy is prepared in advance and held in the server 11.

Then, by extracting a part of the object absolute coordinate coded data with the highest accuracy, it is possible to obtain the object absolute coordinate coded data obtained by quantizing the object absolute coordinate position information with arbitrary quantization accuracy.

Therefore, the coded data sending unit 22 extracts a part or all of the object absolute coordinate coded data with the highest accuracy according to the distance from the listening position to the object, and transmits the resultant object absolute coordinate coded data with predetermined accuracy to the client 12. Note that, in such a case, it is sufficient if the coded data sending unit 22 acquires the listener position information from the listener position information acquisition unit 41 via the configuration information sending unit 21, the configuration information acquisition unit 43, and the viewpoint selection unit 42.

Furthermore, in the content reproduction system illustrated in FIG. 2, system configuration information including each piece of information from Information IFA1 to Information IFA3 among Information IFA1 to Information IFA4 is prepared in advance.

This system configuration information is transmitted to the client 12 side prior to transmission of data related to an object, that is, object absolute coordinate coded data or coded audio data.

A specific example of such system configuration information is as illustrated, for example, in FIG. 5.

In the example illustrated in FIG. 5, similarly to the example illustrated in FIG. 4, the system configuration information includes the number of objects "NumOfObjs" and the number of reference viewpoints "NumfOfRefViewPoint".

Furthermore, the system configuration information includes the reference viewpoint information corresponding to the number of reference viewpoints "NumfOfRefViewPoint".

That is, the system configuration information includes the X coordinate "RefViewX[i]", the Y coordinate "RefViewY[i]", and the Z coordinate "RefViewZ[i]" of the common absolute coordinate system indicating the position of the reference viewpoint constituting the reference viewpoint position information of the i-th reference viewpoint. As described above, in this example, the reference viewpoint information does not include the listener direction information, but includes only the reference viewpoint position information.

Moreover, the system configuration information includes reproduction mode "ObjectOverLapMode[i]" in a case where the positions of the listener and the object overlap with each other for each object.

The system configuration information obtained as described above, the object polar coordinate coded data or the object absolute coordinate coded data of each object for each reference viewpoint, and the coded gain information obtained by coding the gain information indicating the gain amount are held in the server 11.

Note that, hereinafter, the object polar coordinate position information and the object absolute coordinate position information are also simply referred to as object position information in a case where it is not particularly necessary to distinguish the object polar coordinate position information and the object absolute coordinate position information. Similarly, hereinafter, the object polar coordinate coded data and the object absolute coordinate coded data are also simply referred to as object coordinate coded data in a case where it is not particularly necessary to distinguish the object polar coordinate coded data and the object absolute coordinate coded data.

When the operation of the content reproduction system is started, the configuration information sending unit 21 of the server 11 transmits the system configuration information to the client 12 side prior to the transmission of the object coordinate coded data. Therefore, the client 12 side can understand the number of objects constituting the content, the number of reference viewpoints, the position of the reference viewpoint in the common absolute coordinate space, and the like.

Next, the viewpoint selection unit 42 of the client 12 selects a reference viewpoint according to the listener position information, and the configuration information acquisition unit 43 sends the viewpoint selection information indicating the selection result to the server 11.

Note that, as described above, the viewpoint selection unit 42 may be provided in the server 11, and the reference viewpoint may be selected on the server 11 side.

In such a case, the viewpoint selection unit 42 selects a reference viewpoint on the basis of the listener position information received from the client 12 by the configuration information sending unit 21 and the system configuration information, and supplies the viewpoint selection information indicating the selection result to the coded data sending unit 22.

At this time, the viewpoint selection unit 42 specifies and selects, for example, two (or two or more) reference viewpoints sandwiching the listening position indicated by the listener position information. In other words, the two reference viewpoints are selected such that the listening position is located between the two reference viewpoints.

Therefore, the object coordinate coded data for each of the plurality of selected reference viewpoints is transmitted to the client 12 side. Furthermore, in more detail, the coded data sending unit 22 transmits not only the object coordinate coded data but also the coded gain information to the client 12 regarding the two reference viewpoints indicated by the viewpoint selection information.

On the client 12 side, the object absolute coordinate position information and the gain information at an arbitrary viewpoint of the current listener are calculated by interpolation processing or the like on the basis of the object coordinate coded data, the coded gain information at each of the plurality of reference viewpoints received from the server 11, and the listener position information.

Here, a specific example of calculation of final object absolute coordinate position information and gain information at an arbitrary viewpoint of the current listener will be described.

In particular, an example of the interpolation processing using the data set of reference viewpoints of the polar coordinate system as two reference viewpoints sandwiching the listener will be described below.

In such a case, the client 12 performs Processing PC1 to Processing PC4 described below in order to obtain final object absolute coordinate position information and gain information at the viewpoint of the listener.

(Processing PC1)

In Processing PC1, each reference viewpoint is set as an origin from the data set at two reference viewpoints of the polar coordinate system, and the transformation into the absolute coordinate system position is performed on the object included in each data set. That is, the coordinate transformation unit 46 performs coordinate transformation as Processing PC1 with respect to the object polar coordinate position information of each object for each reference viewpoint, and generates the object absolute coordinate position information.

Figure 6:
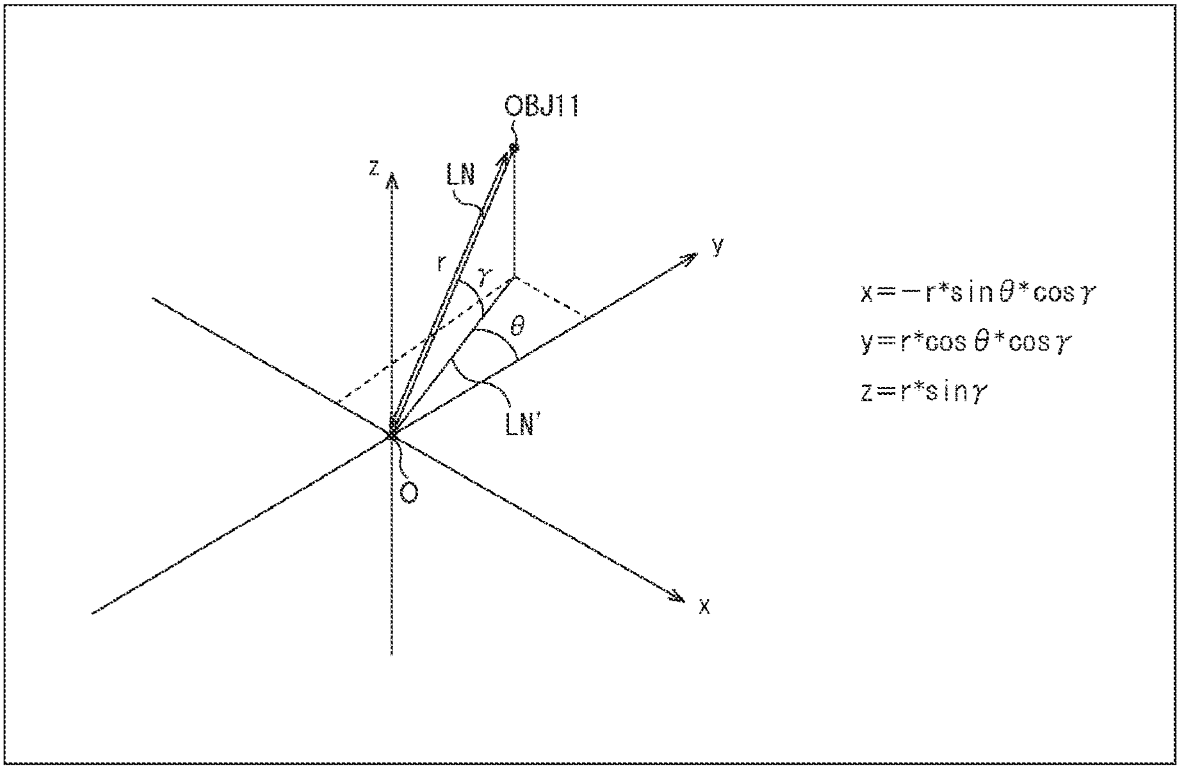
FIG. 6 is a diagram describing coordinate transformation.

For example, as illustrated in FIG. 6, it is assumed that there is one object OBJ11 in a polar coordinate system space based on an origin O. Furthermore, a three-dimensional orthogonal coordinate system (absolute coordinate system) having the origin O as a reference (origin) and having an x axis, a y axis, and a z axis as respective axes is referred to as an xyz coordinate system.

In this case, the position of the object OBJ11 in the polar coordinate system can be represented by polar coordinates including a horizontal angle θ, which is an angle in the horizontal direction, a vertical angle γ, which is an angle in the vertical direction, and a radius r indicating the distance from the origin O to the object OBJ11. In this example, the polar coordinates (θ, γ, r) are object polar coordinate position information of the object OBJ11.

Note that the horizontal angle θ is an angle in the horizontal direction starting from the origin O, that is, the front of the listener. In this example, when a straight line (line segment) connecting the origin O and the object OBJ11 is LN and a straight line obtained by projecting the straight line LN on the xy plane is LN', an angle formed by the y axis and the straight line LN' is the horizontal angle θ.

Furthermore, the vertical angle γ is an angle in the vertical direction starting from the origin O, that is, the front of the listener, and in this example, an angle formed by the straight line LN and the xy plane is the vertical angle γ. Moreover, the radius r is a distance from the listener (origin O) to the object OBJ11, that is, the length of the straight line LN.

When the position of such object OBJ11 is expressed by coordinates (x, y, z) of the xyz coordinate system, that is, absolute coordinates, the position is indicated by Formula (1) described below.

[Math. 1]

$$x=-r*\sin\theta*\cos\gamma$$

$$y=r*\cos\theta*\cos\gamma$$

$$z=r*\sin\gamma \quad (1)$$

In Processing PC1, by calculating Formula (1) on the basis of the object polar coordinate position information, which is polar coordinates, the object absolute coordinate position information, which is absolute coordinates, indicating the position of the object in the xyz coordinate system (absolute coordinate system) having the position of the reference viewpoint as the origin O is calculated.

In particular, in Processing PC1, for each of the two reference viewpoints, coordinate transformation is performed on the object polar coordinate position information of each of the plurality of objects at the reference viewpoints.

(Processing PC2)

In Processing PC2, for each of the two reference viewpoints, coordinate axis transformation processing is performed on the object absolute coordinate position information obtained by Processing PC1 for each object. That is, the coordinate axis transformation processing unit 47 performs the coordinate axis transformation processing as Processing PC2.

The object absolute coordinate position information at each of the two reference viewpoints obtained by Processing PC1 described above, that is, obtained by the coordinate transformation unit 46 indicates the position in the xyz coordinate system having the reference viewpoints as the origin O. Therefore, the coordinates (coordinate system) of the object absolute coordinate position information are different for each reference viewpoint.

Thus, the coordinate axis transformation processing of integrating the object absolute coordinate position information at each reference viewpoint into absolute coordinates of one common absolute coordinate system, that is, absolute coordinates in the common absolute coordinate system (common absolute coordinate space) is performed as Processing PC2.

In order to perform this coordinate axis transformation processing, in addition to the data set for each reference viewpoint, that is, the object absolute coordinate position information of each object for each reference viewpoint, absolute position information (reference viewpoint position information) of the listener and the listener direction information indicating the direction of the face of the listener are required.

That is, the coordinate axis transformation processing requires the object absolute coordinate position information obtained by Processing PC1 and the system configuration information including the reference viewpoint position information indicating the position of the reference viewpoint in the common absolute coordinate system and the listener direction information at the reference viewpoint.

Note that, here for the sake of brief description, only the rotation angle in the horizontal direction is used as the direction of the face indicated by the listener direction information, but information of up-and-down motion (pitch) of the face can also be added.

Figure 7:
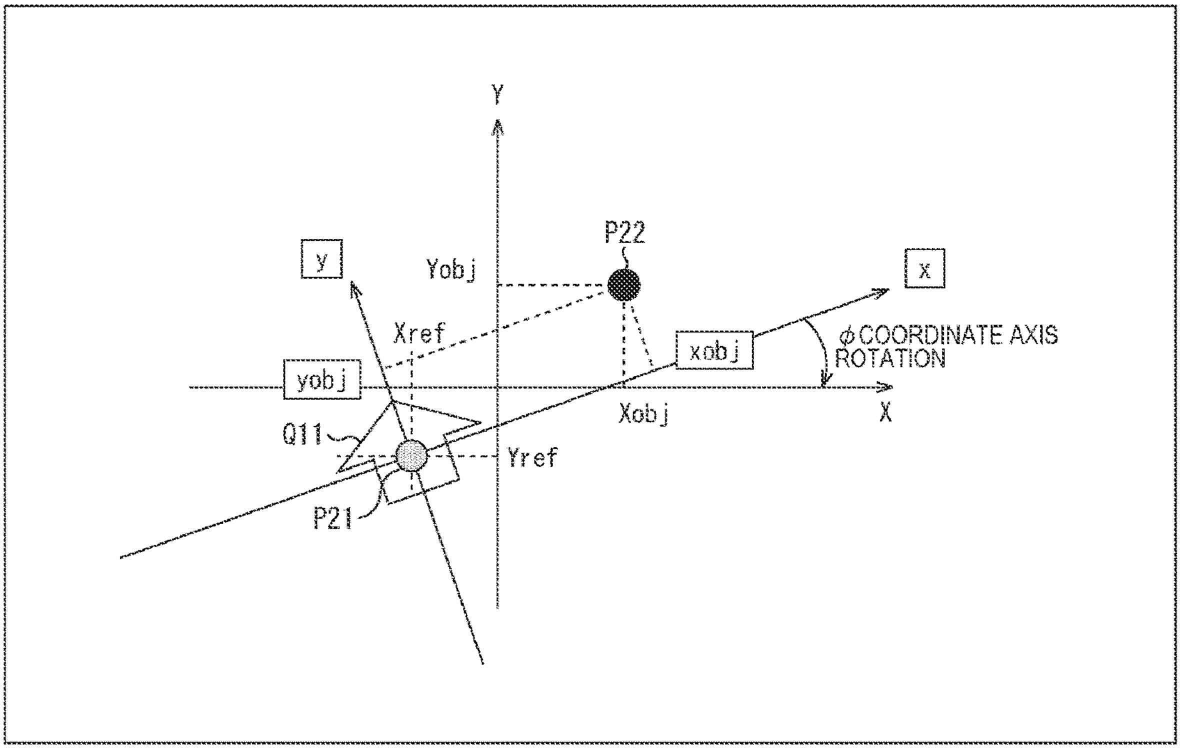
FIG. 7 is a diagram describing coordinate axis transformation processing.

Now, assuming that the common absolute coordinate system is an XYZ coordinate system having an X axis, a Y axis, and a Z axis as respective axes, and the rotation angle according to the direction of the face indicated by the listener direction information is φ, for example, the coordinate axis transformation processing is performed as illustrated in FIG. 7.

That is, in the example illustrated in FIG. 7, as the coordinate axis transformation processing, the coordinate axis rotation of rotating the coordinate axis by the rotation angle φ, and the processing of shifting the origin of the coordinate axis from the position of the reference viewpoint to the origin position of the common absolute coordinate system, in more detail, the processing of shifting the position of the object according to the positional relationship between the reference viewpoint and the origin of the common absolute coordinate system are performed.

In FIG. 7, a position P21 indicates the position of the reference viewpoint, and an arrow Q11 indicates the direction of the face of the listener indicated by the listener direction information at the reference viewpoint. In particular, here, the X coordinate and the Y coordinate of the position P21 in the common absolute coordinate system (XYZ coordinate system) are (Xref, Yref).

Furthermore, a position P22 indicates the position of the object when the reference viewpoint is at the position P21. Here, the X coordinate and the Y coordinate of the common absolute coordinate system indicating the position P22 of the object are (Xobj, Yobj), and the x coordinate and the y coordinate of the xyz coordinate system indicating the position P22 of the object and having the reference viewpoint as the origin are (xobj, yobj).

Moreover, in this example, the angle φ formed by the X axis of the common absolute coordinate system (XYZ coordinate system) and the x axis of the xyz coordinate system is the rotation angle φ of the coordinate axis transformation obtained from the listener direction information.

Therefore, for example, the coordinate axis X (X coordinate) and the coordinate axis Y (Y coordinate) after the transformation are as indicated in Formula (2) described below.

[Math. 2]

$$X=\text{Reference viewpoint } X \text{ coordinate value}+x*\cos(\phi)+y*\sin(\phi)$$

$$Y=\text{Reference viewpoint } Y \text{ coordinate value}-x*\sin(\phi)+y*\cos(\phi) \quad (2)$$

Note that, in Formula (2), x and y represent the x axis (x coordinate) and the y axis (y coordinate) before transformation, that is, in the xyz coordinate system. Furthermore, “reference viewpoint X coordinate value” and “reference viewpoint Y coordinate value” in Formula (2) indicate an X coordinate and a Y coordinate indicating the position of the reference viewpoint in the XYZ coordinate system (common absolute coordinate system), that is, an X coordinate and a Y coordinate constituting the reference viewpoint position information.

Given the above, in the example of FIG. 7, the X coordinate value Xobj and the Y coordinate value Yobj indicating the position of the object after the coordinate axis transformation processing can be obtained from Formula (2).

That is, φ in Formula (2) is set as the rotation angle φ obtained from the listener direction information at the position P21, and "Xref", "xobj", and "yobj" are substituted into "reference viewpoint X coordinate value", "x", and "y" in Formula (2), respectively, and the X coordinate value Xobj can be obtained.

Furthermore, φ in Formula (2) is set as the rotation angle φ obtained from the listener direction information at the position P21, and "Yref", "xobj", and "yobj" are substituted into "reference viewpoint Y coordinate value", "x", and "y" in Formula (2), respectively, and the Y coordinate value Yobj can be obtained.

Similarly, for example, when two reference viewpoints A and B are selected according to the viewpoint selection information, the X coordinate value and the Y coordinate value indicating the position of the object after the coordinate axis transformation processing for those reference viewpoints are as indicated in Formula (3) described below.

[Math. 3]

$$xa = X\text{ coordinate value of reference viewpoint } A + x*\cos(\phi a) + y*\sin(\phi a)$$

$$ya = Y\text{ coordinate value of reference viewpoint } A - x*\sin(\phi a) + y*\cos(\phi a)$$

$$xb = X\text{ coordinate value of reference viewpoint } B + x*\cos(\phi b) + y*\sin(\phi b)$$

$$yb = Y\text{ coordinate value of reference viewpoint } B - x*\sin(\phi b) + y*\cos(\phi b) \quad (3)$$

Note that, in Formula (3), xa and ya represent the X coordinate value and the Y coordinate value of the XYZ coordinate system after the axis transformation (after the coordinate axis transformation processing) for the reference viewpoint A, and φa represents the rotation angle of the axis transformation for the reference viewpoint A, that is, the above-described rotation angle φ.

Thus, when the x coordinate and the y coordinate constituting the object absolute coordinate position information at the reference viewpoint A obtained in Processing PC1 are substituted into Formula (3), the coordinate xa and the coordinate ya are obtained as the X coordinate and the Y coordinate indicating the position of the object in the XYZ coordinate system (common absolute coordinate system) at the reference viewpoint A. Absolute coordinates including the coordinate xa and the coordinate ya thus obtained and the Z coordinate are the object absolute coordinate position information output from the coordinate axis transformation processing unit 47.

Note that, in this example, since only the rotation angle φ in the horizontal direction is handled, the coordinate axis transformation is not performed for the Z axis (Z coordinate). Therefore, for example, it is sufficient if the z coordinate constituting the object absolute coordinate position information obtained in Processing PC1 is used as it is as the Z coordinate indicating the position of the object in the common absolute coordinate system.

Similar to the reference viewpoint A, in Formula (3), xb and yb represent the X coordinate value and the Y coordinate value of the XYZ coordinate system after the axis transformation (after the coordinate axis transformation processing) for the reference viewpoint B, and φb represents the rotation angle of the axis transformation for the reference viewpoint B (rotation angle φ).

In the coordinate axis transformation processing unit 47, the coordinate axis transformation processing as described above is performed as Processing PC2.

Figure 8:
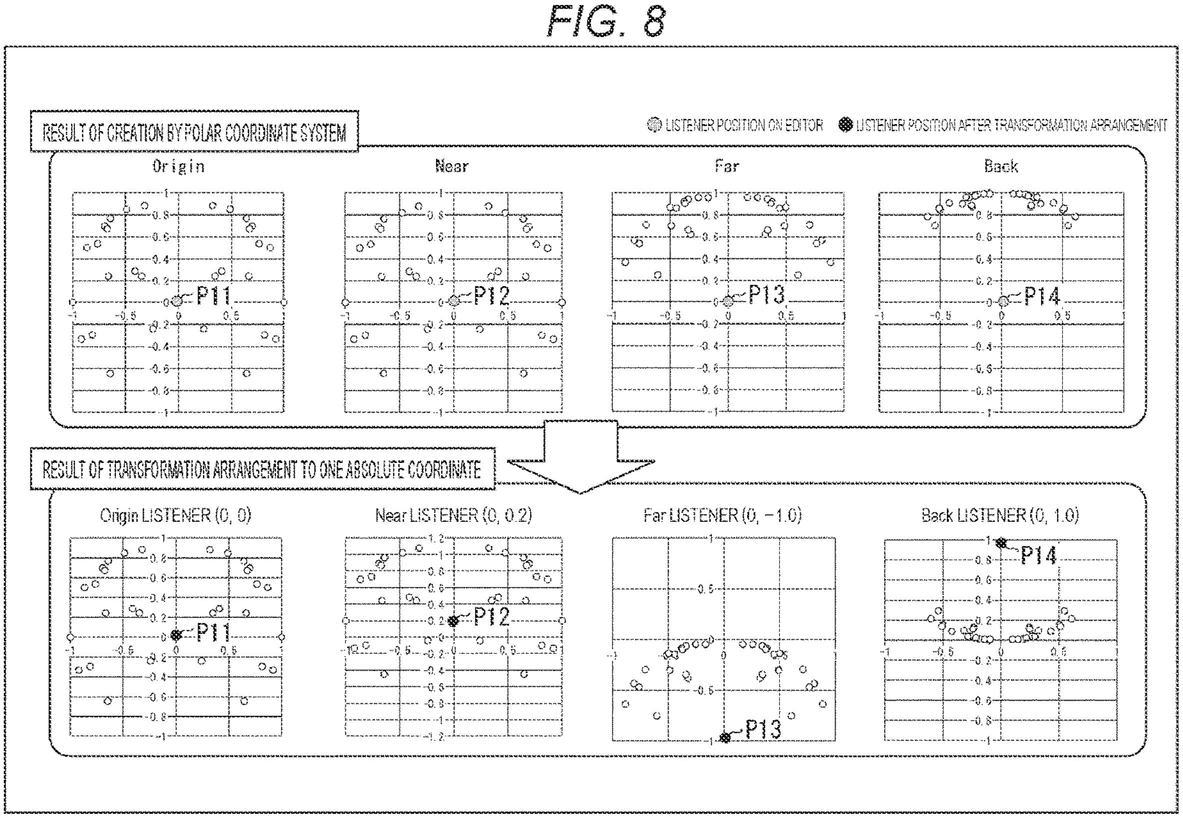
FIG. 8 is a diagram illustrating an example of a transformation result by the coordinate axis transformation processing.

Therefore, for example, when the coordinate axis transformation processing is performed on each of the four reference viewpoints illustrated in FIG. 3, the transformation result illustrated in FIG. 8 is obtained. Note that portions in FIG. 8 corresponding to those of FIG. 3 are designated by the same reference numerals, and description is omitted as appropriate.

In FIG. 8, each circle (ring) represents one object. Furthermore, in FIG. 8, the upper side of the drawing illustrates the position of each object on the polar coordinate system indicated by the object polar coordinate position information, and the lower side of the drawing illustrates the position of each object in the common absolute coordinate system.

In particular, in FIG. 8, the left end illustrates the result of the coordinate axis transformation for the reference viewpoint "Origin" at the position P11 illustrated in FIG. 3, and the second from the left in FIG. 8 illustrates the result of the coordinate axis transformation for the reference viewpoint "Near" at the position P12 illustrated in FIG. 3.

Furthermore, in FIG. 8, the third from the left illustrates the result of the coordinate axis transformation for the reference viewpoint "Far" at the position P13 illustrated in FIG. 3, and the right end in FIG. 8 illustrates the result of the coordinate axis transformation for the reference viewpoint "Back" at the position P14 illustrated in FIG. 3.

For example, regarding the reference viewpoint "Origin", since it is the origin viewpoint in which the position of the origin of the polar coordinate system is the position of the origin of the common absolute coordinate system, the position of the object viewed from the origin does not change before and after the transformation. On the other hand, at the remaining three reference viewpoints "Near", "Far", and "Back", it can be seen that the position of the object is shifted to the absolute coordinate position viewed from each viewpoint position. In particular, at the reference viewpoint "Back", since the direction of the face of the listener indicated by the listener direction information is backward, the object is positioned behind the reference viewpoint after the coordinate axis transformation processing.

(Processing PC3)

In Processing PC3, the proportion ratio for the interpolation processing is obtained from the positional relationship between the absolute coordinate position of each of the two reference viewpoints, that is, the position indicated by the reference viewpoint position information included in the system configuration information and arbitrary listening position sandwiched between the positions of the two reference viewpoints.

That is, the object position calculation unit 48 performs processing of obtaining the proportion ratio (m:n) as Processing PC3 on the basis of the listener position information supplied from the listener position information acquisition unit 41 and the reference viewpoint position information included in the system configuration information.

Here, it is assumed that the reference viewpoint position information indicating the position of the reference viewpoint A is (x1, y1, z1), which is the first reference viewpoint, the reference viewpoint position information indicating the position of the reference viewpoint B is (x2, y2, z2), which is the second reference viewpoint, and the listener position information indicating the listening position is (x3, y3, z3).

In this case, the object position calculation unit 48 calculates the proportion ratio (m:n), that is, m and n of the proportion ratio by calculating Formula (4) described below.

[Math. 4]

$$m=\mathrm{SQRT}((x3-x1)*(x3-x1)+(y3-y1)*(y3-y1)+(z3-z1)*(z3-z1))$$

$$n=\mathrm{SQRT}((x3-x2)*(x3-x2)+(y3-y2)*(y3-y2)+(z3-z2)*(z3-z2)) \quad (4)$$

(Processing PC4)

Subsequently, the object position calculation unit 48 performs the interpolation processing as Processing PC4 on the basis of the proportion ratio (m:n) obtained by Processing PC3 and the object absolute coordinate position information of each object of the two reference viewpoints supplied from the coordinate axis transformation processing unit 47.

That is, in Processing PC4, by applying the proportion ratio (m:n) obtained in Processing PC3 to the same object corresponding to the two reference viewpoints obtained in Processing PC2, the object position and the gain amount corresponding to an arbitrary listening position are obtained.

Here, the absolute coordinate position of a predetermined object viewed from the reference viewpoint A, that is, the object absolute coordinate position information of the reference viewpoint A obtained by Processing PC2 is (xa, ya, za), and the gain amount indicated by the gain information of the predetermined object for the reference viewpoint A is g1.

Similarly, the absolute coordinate position of the above-described predetermined object viewed from the reference viewpoint B, that is, the object absolute coordinate position information of the reference viewpoint B obtained by Processing PC2 is (xb, yb, zb), and the gain amount indicated by the gain information of the object for the reference viewpoint B is g2.

Furthermore, the absolute coordinates indicating the position of the above-described predetermined object in the XYZ coordinate system (common absolute coordinate system) and the gain amount corresponding to an arbitrary viewpoint position between the reference viewpoint A and the reference viewpoint B, that is, the listening position indicated by the listener position information are set as (xc, yc, zc) and gain_c. The absolute coordinates (xc, yc, zc) are final object absolute coordinate position information output from the object position calculation unit 48 to the polar coordinate transformation unit 49.

At this time, the final object absolute coordinate position information (xc, yc, zc) and the gain amount gain_c for the predetermined object can be obtained by calculating Formula (5) described below using the proportion ratio (m:n).

[Math. 5]

$$xc=(m*xb+n*xa)/(m+n)$$

$$yc=(m*yb+n*ya)/(m+n)$$

$$zc=(m*zb+n*za)/(m+n)$$

$$\mathrm{gain\_}c=(m*g2+n*g1)/(m+n) \quad (5)$$

Figure 9:
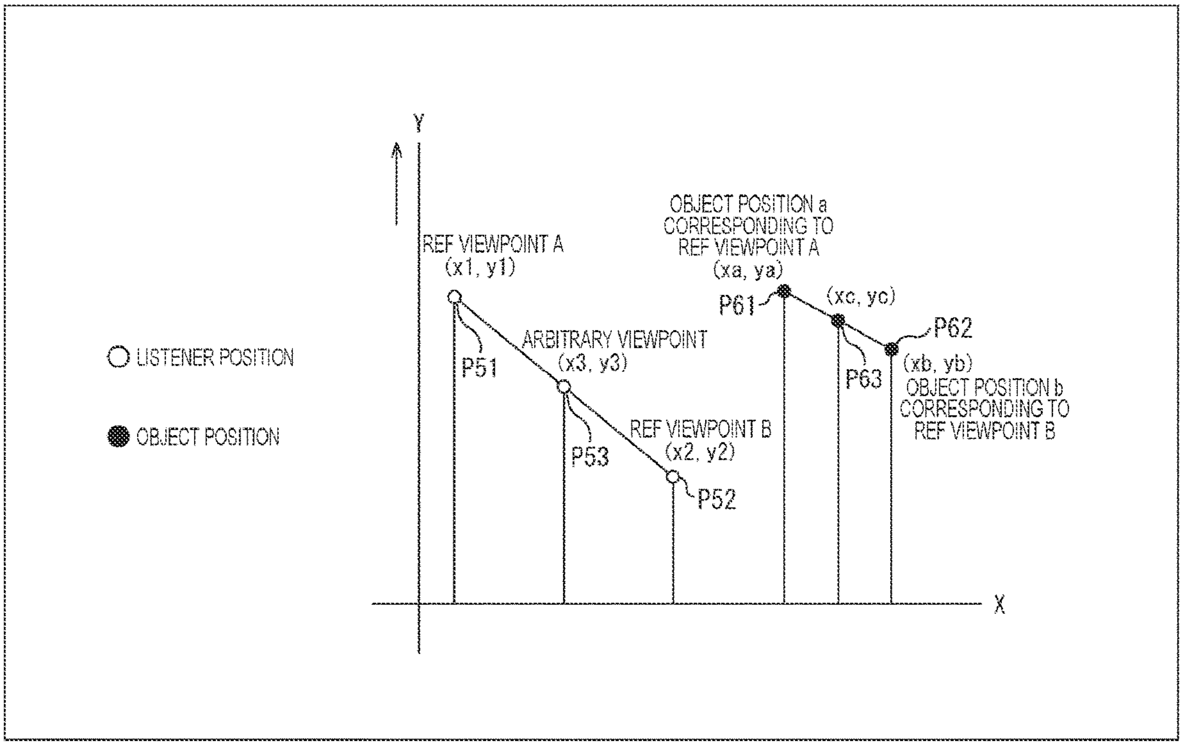
FIG. 9 is a diagram describing interpolation processing.

The positional relationship between the reference viewpoint A, the reference viewpoint B, and the listening position described above and the positional relationship of the same object at the respective positions of the reference viewpoint A, the reference viewpoint B, and the listening position are as illustrated in FIG. 9.

In FIG. 9, the horizontal axis and the vertical axis indicate the X axis and the Y axis of the XYZ coordinate system (common absolute coordinate system), respectively. Note that, here for the sake of brief description, only the X-axis direction and the Y-axis direction are illustrated.

In this example, a position P51 is a position indicated by the reference viewpoint position information (x1, y1, z1) of the reference viewpoint A, and a position P52 is a position indicated by the reference viewpoint position information (x2, y2, z2) of the reference viewpoint B.

Furthermore, a position P53 between the reference viewpoint A and the reference viewpoint B is a listening position indicated by the listener position information (x3, y3, z3).

In Formula (4) described above, the proportion ratio (m:n) is obtained on the basis of the positional relationship between the reference viewpoint A, the reference viewpoint B, and the listening position.

Furthermore, a position P61 is a position indicated by the object absolute coordinate position information (xa, ya, za) at the reference viewpoint A, and a position P62 is a position indicated by the object absolute coordinate position information (xb, yb, zb) at the reference viewpoint B.

Moreover, a position P63 between the position P61 and the position P62 is a position indicated by the object absolute coordinate position information (xc, yc, zc) at the listening position.

By performing the calculation of Formula (5), that is, the interpolation processing in this manner, the object absolute coordinate position information indicating an appropriate object position can be obtained for an arbitrary listening position.

Note that the example of obtaining the object position, that is, the final object absolute coordinate position information using the proportion ratio (m:n) has been described above, but it is not limited thereto, and the final object absolute coordinate position information may be estimated using machine learning or the like.

Furthermore, in a case where an absolute coordinate system editor is used, that is, in the case of the content reproduction system illustrated in FIG. 2, each object position of each reference viewpoint, that is, the position indicated by the object absolute coordinate position information is a position on one common absolute coordinate system. In other words, the position of the object at each reference viewpoint is expressed by absolute coordinates of the common absolute coordinate system.

Therefore, in the content reproduction system illustrated in FIG. 2, it is sufficient if the object absolute coordinate position information obtained by the decoding of the decode unit 45 is used as the input in Processing PC3 described above. That is, it is sufficient if the calculation of Formula (4) is performed on the basis of the object absolute coordinate position information obtained by decoding.

<Regarding Operation of the Content Reproduction System>

Figure 10:
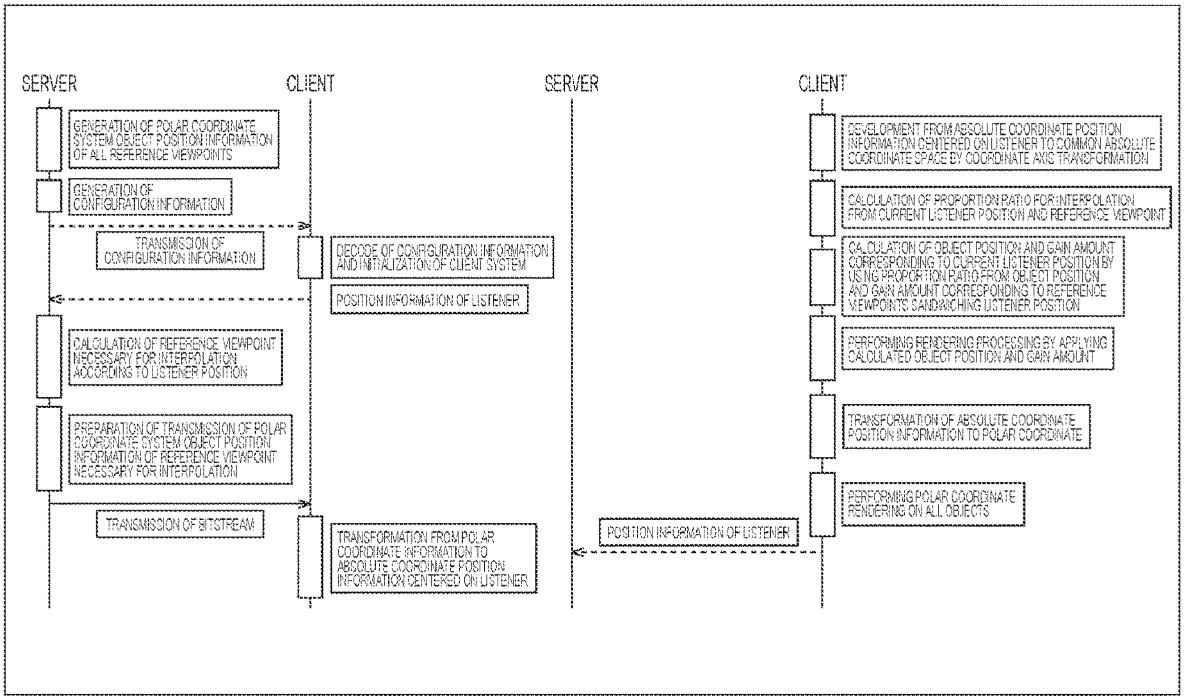
FIG. 10 is a diagram illustrating a sequence example of a content reproduction system.

Next, a flow (sequence) of processing performed in the content reproduction system described above will be described with reference to FIG. 10.

Note that, here, an example in which the reference viewpoint is selected on the server 11 side and the object polar coordinate coded data is prepared in advance on the server 11 side will be described. That is, an example in which the viewpoint selection unit 42 is provided on the server 11 side in the example of the content reproduction system illustrated in FIG. 1 will be described.

First, on the server 11 side, for all reference viewpoints, the polar coordinate system object position information, that is, object polar coordinate coded data is generated and held by a polar coordinate system editor, and system configuration information is also generated and held.

Then, the configuration information sending unit 21 transmits the system configuration information to the client 12 via a network or the like.

Then, the configuration information acquisition unit 43 of the client 12 receives the system configuration information transmitted from the server 11 and supplies the system configuration information to the coordinate axis transformation processing unit 47. At this time, the client 12 decodes (decoding) the received system configuration information and initializes the client system.

Subsequently, when the listener position information acquisition unit 41 acquires the listener position information and supplies the listener position information to the configuration information acquisition unit 43, the configuration information acquisition unit 43 transmits the listener position information supplied from the listener position information acquisition unit 41 to the server 11.

Furthermore, the configuration information sending unit 21 receives the listener position information transmitted from the client 12 and supplies the listener position information to the viewpoint selection unit 42. Then, the viewpoint selection unit 42 selects reference viewpoints necessary for the interpolation processing, that is, for example, two reference viewpoints sandwiching the above-described listening position on the basis of the listener position information supplied from the configuration information sending unit 21 and the system configuration information, and supplies the viewpoint selection information indicating the selection result to the coded data sending unit 22.

The coded data sending unit 22 prepares for transmission of the polar coordinate system object position information of the reference viewpoints necessary for the interpolation processing according to the viewpoint selection information supplied from the viewpoint selection unit 42.

That is, the coded data sending unit 22 generates a bitstream by reading and multiplexing the object polar coordinate coded data of the reference viewpoint indicated by the viewpoint selection information and the coded gain information. Then, the coded data sending unit 22 transmits the generated bitstream to the client 12.

The coded data acquisition unit 44 receives and demultiplexes the bitstream transmitted from the server 11, and supplies the resultant object polar coordinate coded data and coded gain information to the decode unit 45.

The decode unit 45 decodes the object polar coordinate coded data supplied from the coded data acquisition unit 44, and supplies the resultant object polar coordinate position information to the coordinate transformation unit 46. Furthermore, the decode unit 45 decodes the coded gain information supplied from the coded data acquisition unit 44, and supplies the resultant gain information to the object position calculation unit 48 via the coordinate transformation unit 46 and the coordinate axis transformation processing unit 47.

The coordinate transformation unit 46 transforms the polar coordinate information into absolute coordinate position information centered on the listener for the object polar coordinate position information supplied from the decode unit 45.

That is, for example, the coordinate transformation unit 46 calculates Formula (1) described above on the basis of the object polar coordinate position information and supplies the resultant object absolute coordinate position information to the coordinate axis transformation processing unit 47.

Subsequently, the coordinate axis transformation processing unit 47 performs development from the absolute coordinate position information centered on the listener to the common absolute coordinate space by coordinate axis transformation.

For example, the coordinate axis transformation processing unit 47 performs the coordinate axis transformation processing by calculating Formula (3) described above on the basis of the system configuration information supplied from the configuration information acquisition unit 43 and the object absolute coordinate position information supplied from the coordinate transformation unit 46, and supplies the resultant object absolute coordinate position information to the object position calculation unit 48.

The object position calculation unit 48 calculates a proportion ratio for interpolation processing from the current listener position and the reference viewpoint.

For example, the object position calculation unit 48 calculates Formula (4) described above on the basis of the listener position information supplied from the listener position information acquisition unit 41 and the reference viewpoint position information of the plurality of reference viewpoints selected by the viewpoint selection unit 42, and calculates the proportion ratio (m:n).

Furthermore, the object position calculation unit 48 calculates the object position and the gain amount corresponding to the current listener position using the proportion ratio from the object position and the gain amount corresponding to the reference viewpoints sandwiching the listener position.

For example, the object position calculation unit 48 performs interpolation processing by calculating Formula (5) described above on the basis of the object absolute coordinate position information and the gain information supplied from the coordinate axis transformation processing unit 47 and the proportion ratio (m:n), and supplies the resultant final object absolute coordinate position information and the gain information to the polar coordinate transformation unit 49.

Then, thereafter, the client 12 performs rendering processing to which the calculated object position and gain amount are applied.

For example, the polar coordinate transformation unit 49 performs transformation of the absolute coordinate position information into polar coordinates.

That is, for example, the polar coordinate transformation unit 49 performs the polar coordinate transformation on the object absolute coordinate position information supplied from the object position calculation unit 48 on the basis of the listener position information supplied from the listener position information acquisition unit 41.

The polar coordinate transformation unit 49 supplies the polar coordinate position information obtained by the polar coordinate transformation and the gain information supplied from the object position calculation unit 48 to the subsequent rendering processing unit.

Then, the rendering processing unit performs polar coordinate rendering processing on all the objects.

That is, the rendering processing unit performs the rendering processing in the polar coordinate system defined, for example, by MPEG-H on the basis of the polar coordinate position information and the gain information of all the objects supplied from the polar coordinate transformation unit 49, and generates reproduction audio data for reproducing the sound of the content.

Here, for example, vector based amplitude panning (VBAP) or the like is performed as the rendering processing in the polar coordinate system defined by MPEG-H. Note that, in more detail, gain adjustment based on the gain information is performed on the audio data before the rendering processing, but the gain adjustment may be performed not by the rendering processing unit but by the preceding polar coordinate transformation unit 49.

When the above processing is performed on a predetermined frame and the reproduction audio data is generated, content reproduction based on the reproduction audio data is appropriately performed. Then, thereafter, the listener position information is appropriately transmitted from the client 12 to the server 11, and the above-described processing is repeatedly performed.

As described above, the content reproduction system calculates the object absolute coordinate position information and the gain information of an arbitrary listening position by interpolation processing from the object position information of the plurality of reference viewpoints. In this way, it is possible to realize the object arrangement based on the intention of the content creator according to the listening position instead of the simple physical relationship between the listener and the object. Therefore, content reproduction based on the intention of the content creator can be realized, and the interest of the content can be sufficiently conveyed to the listener.

<Regarding the Listener and the Object>

By the way, as the reference viewpoint, for example, two examples of assuming a viewpoint as a listener and assuming a viewpoint of a performer imagining to be an object are conceivable.

In the latter case, since the listener and the object overlap at the reference viewpoint, that is, the listener and the object are at the same position, the following Cases CA1 to CA3 are conceivable.

(Case CA1)

The listener is prohibited from overlapping with the object, or the listener is prohibited from entering a specific range (Case CA2)

The listener is merged with the object and a sound generated from the object is output from all channels (Case CA3)

A sound generated from overlapping objects is muted or attenuated

For example, in the case of Case CA2, the sense of localization in the head of the listener can be recreated.

Furthermore, in Case CA3, by muting or attenuating the sound of the object, the listener becomes a performer, and, for example, use in a karaoke mode is also conceivable. In this case, a surrounding accompaniment or the like other than the performer's singing voice surrounds the listener itself, and a feeling of singing thereinside can be obtained.

In a case where the content creator has such intention, identifiers indicating Cases CA1 to CA3 can be stored in a coded bitstream transmitted from the server 11 and can be transmitted to the client 12 side. For example, such an identifier is information indicating the above-described reproduction mode.

Furthermore, in the content reproduction system described above, the listener may move around between two reference viewpoints.

In such a case, there may be a case where some listener desires to intentionally bring an object (viewpoint) closer to the object arrangement of one (one side) of the two reference viewpoints. Specifically, for example, there may be a request for maintaining an angle that allows the listener's favorite artist to be easily seen at all times.

Therefore, for example, the degree of bringing may be controlled by biasing the proportion processing of the internal division ratio. This can be realized by newly introducing a bias coefficient α into Formula (5) for obtaining interpolation described above, for example, as illustrated in FIG. 11.

Figure 11:
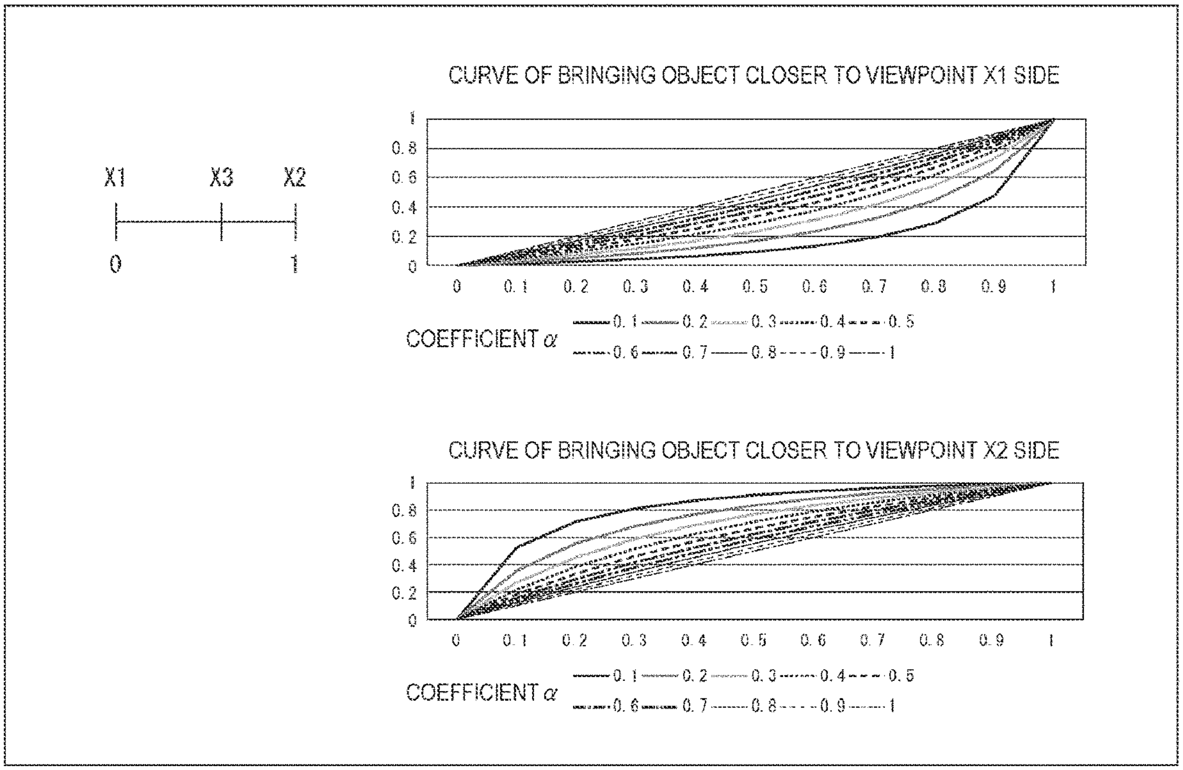
FIG. 11 is a diagram describing an example of bringing an object closer to arrangement at a reference viewpoint.

FIG. 11 illustrates characteristics in a case where the bias coefficient α is multiplied. In particular, the upper side in the drawing illustrates an example of bringing the object closer to the arrangement on a viewpoint X1 side, that is, the above-described reference viewpoint A side.

On the other hand, the lower side in the drawing illustrates an example of bringing the object closer to the arrangement on a viewpoint X2 side, that is, the above-described reference viewpoint B side.

Note that, in FIG. 11, the horizontal axis indicates the position of a predetermined viewpoint X3 in a case where the bias coefficient α is not introduced, and the vertical axis indicates the position of a predetermined viewpoint X3 in a case where the bias coefficient α is introduced. Furthermore, here, the position of the reference viewpoint A (viewpoint X1) is "0", and the position of the reference viewpoint B (viewpoint X2) is "1".

In the example of the upper side in the drawing, for example, when the listener moves from the reference viewpoint A (viewpoint X1) side to the position of the reference viewpoint B (viewpoint X2), the smaller the bias coefficient α, the more the listener feels difficulty to reach the position of the reference viewpoint B (viewpoint X2).

Conversely, in the example of the lower side in the drawing, for example, when the listener moves from the reference viewpoint A side to the position of the reference viewpoint B, the smaller the bias coefficient α, the more the listener feels to immediately reach the position of the reference viewpoint B.

For example, in the case of bringing the object closer to the arrangement on the reference viewpoint A side, the final object absolute coordinate position information (xc, yc, zc) and the gain amount gain_c can be obtained by calculating Formula (6) described below.

On the other hand, in the case of bringing the object closer to the arrangement on the reference viewpoint B side, the final object absolute coordinate position information (xc, yc, zc) and the gain amount gain_c can be obtained by calculating Formula (7) described below.

However, in Formulae (6) and (7), m and n of the proportion ratio (m:n) and the bias coefficient α are as indicated in Formula (8) described below.

[Math. 6]

$$xc=(M*xb+\alpha*n*xa)/(m+\alpha*n)$$

$$yc=(m*yb+\alpha*n*ya)/(m+\alpha*n)$$

$$zc=(m*zb+\alpha*n*za)/(m+\alpha*n)$$

$$\text{gain\_}c=(m*g2+\alpha*n*g1)/(m+\alpha*n) \tag{6}$$

[Math. 7]

$$xc=(\alpha*m*xb+n*xa)/(\alpha*m+n)$$

$$yc=(\alpha*m*yb+n*ya)/(\alpha*m+n)$$

$$zc=(\alpha*m*zb+n*za)/(\alpha*m+n)$$

$$\text{gain\_}c=(\alpha*m*g2+n*g1)/(\alpha*m+n) \tag{7}$$

[Math. 8]

$$m=\mathrm{SQRT}((x3-x1)*(x3-x1)+(y3-y1)*(y3-y1)+(z3-z1)*(z3-z1))$$

$$n=\mathrm{SQRT}((x3-x2)*(x3-x2)+(y3-y2)*(y3-y2)+(z3-z2)*(z3-z2))$$

$$0<\alpha\leq 1 \quad (8)$$

Note that, in Formula (8), the reference viewpoint position information (x1, y1, z1), the reference viewpoint position information (x2, y2, z2), and the listener position information (x3, y3, z3) are similar to those in Formula (4) described above-described.

Obtaining the final object absolute coordinate position information and the gain amount using the bias coefficient α as in Formulae (6) and (7) is to obtain the final object absolute coordinate position information and the gain amount by performing the interpolation processing by giving a weight of the bias coefficient α with respect to the object absolute coordinate position information and the gain information of a predetermined reference viewpoint.

When the object position information of the absolute coordinates after the interpolation processing obtained in this way, that is, the object absolute coordinate position information is combined with the listener position information and transformed into the polar coordinate information (polar coordinate position information), it is possible to perform the polar coordinate rendering processing used in the existing MPEG-H in a subsequent stage.

<Regarding the Interpolation Processing of the Object Absolute Coordinate Position Information and the Gain Information>

Meanwhile, as an example in which the object position calculation unit 48 obtains the object absolute coordinate position information and the gain information at an arbitrary viewpoint position, that is, listening position by the interpolation processing, the two-point interpolation using the information of the two reference viewpoints has been described above.

However, it is not limited thereto, and the object absolute coordinate position information and the gain information at an arbitrary listening position may be obtained by performing three-point interpolation using the information of three reference viewpoints. Furthermore, the object absolute coordinate position information and the gain information at an arbitrary listening position may be obtained by using the information of four or more reference viewpoints. Hereinafter, a specific example in a case where three-point interpolation is performed will be described.

Figure 12:
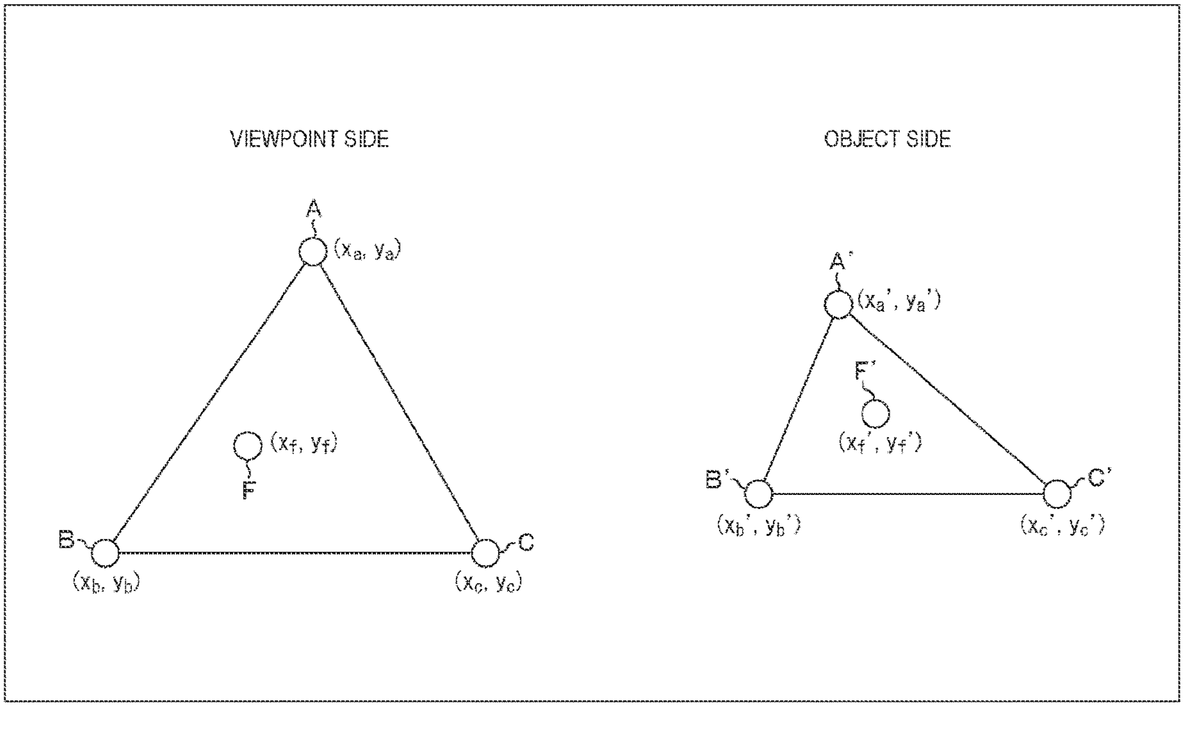
FIG. 12 is a diagram describing interpolation of object absolute coordinate position information.

For example, as illustrated on the left side of FIG. 12, it is considered that the object absolute coordinate position information at an arbitrary listening position F is obtained by the interpolation processing.

In this example, there are three reference viewpoints: reference viewpoint A, reference viewpoint B, and reference viewpoint C so as to surround the listening position F, and here, it is assumed that the interpolation processing is performed using the information of the reference viewpoints A to C.

Hereinafter, it is assumed that the X coordinate and the Y coordinate of the listening position F in the common absolute coordinate system, that is, the XYZ coordinate system, are $(x_f, y_f)$.

Similarly, it is assumed that the X coordinates and the Y coordinates of the respective positions of the reference viewpoint A, the reference viewpoint B, and the reference viewpoint C are $(x_a, y_a)$, $(x_b, y_b)$, and $(x_c, y_c)$.

In this case, as illustrated on the right side of FIG. 12, an object position F' at the listening position F is obtained on the basis of the coordinates of an object position A', an object position B', and an object position C' respectively corresponding to the reference viewpoint A, the reference viewpoint B, and the reference viewpoint C.

Here, for example, the object position A' indicates the position of the object when the viewpoint is at the reference viewpoint A, that is, the position of the object in the common absolute coordinate system indicated by the object absolute coordinate position information of the reference viewpoint A.

Furthermore, the object position F' indicates the position of the object in the common absolute coordinate system when the listener is at the listening position F, that is, the position indicated by the object absolute coordinate position information to be the output of the object position calculation unit 48.

Hereinafter, it is assumed that the X coordinates and the Y coordinates of the object position A', the object position B', and the object position C' are $(x_a', y_a')$, $(x_b', y_b')$, and $(x_c', y_c')$, and the X coordinate and the Y coordinate of the object position F' are $(x_f', y_f')$.

Furthermore, hereinafter, a triangular region surrounded by arbitrary three reference viewpoints such as the reference viewpoints A to C, that is, a region having a triangular shape formed by the three reference viewpoints is also referred to as a triangle mesh.

Since there is a plurality of reference viewpoints in the common absolute coordinate space, a plurality of triangle meshes having the reference viewpoints as vertices can be formed in the common absolute coordinate space.

Similarly, hereinafter, a triangular region surrounded (formed) by the object positions indicated by the object absolute coordinate position information of arbitrary three reference viewpoints such as the object positions A' to C' is also referred to as a triangle mesh.

For example, in the example of two-point interpolation, the listener can move to an arbitrary position on a line segment connecting two reference viewpoints and listen to the sound of the content.

On the other hand, in a case where three-point interpolation is performed, the listener can move to an arbitrary position in the region of the triangle mesh surrounded by the three reference viewpoints and listen to the sound of the content. That is, a region other than a line segment connecting two reference viewpoints in the case of two-point interpolation can be covered as the listening position.

Also in a case where three-point interpolation is performed, similarly to the case of two-point interpolation, coordinates indicating an arbitrary position in the common absolute coordinate system (XYZ coordinate system) can be obtained from the coordinates of the arbitrary position in the xyz coordinate system, the listener direction information, and the reference viewpoint position information by Formula (2) described above.

Note that, here, the Z coordinate value of the XYZ coordinate system is assumed to be the same as the z coordinate value of the xyz coordinate system, but in a case where the Z coordinate value and the z coordinate value are different, it is sufficient if the Z coordinate value indicating an arbitrary position is obtained by adding the Z coordinate value indicating the position of the reference viewpoint in the XYZ coordinate system to the z coordinate value of the arbitrary position.

It is proved by Ceva's theorem that an arbitrary listening position in a triangle mesh formed by three reference viewpoints is uniquely determined by an intersection of line segments from each of three vertices of the triangle mesh to each of internally dividing points of the three sides not adjacent to the vertices when the internal division ratio of each side of the triangle mesh is appropriately determined.

This is established in all the triangle meshes regardless of the shape of the triangle mesh when the configuration of the internal division ratio of the three sides of the triangle mesh is determined from the proof formula.

Therefore, when the internal division ratio of the triangle mesh including the listening position is obtained regarding the viewpoint side, that is, the reference viewpoint, and the internal division ratio is applied to the triangle mesh on the object side, that is, the object position, an appropriate object position for an arbitrary listening position can be obtained.

Hereinafter, an example of obtaining the object absolute coordinate position information indicating the position of the object at the time of being at an arbitrary listening position using such a property of internal division ratio will be described.

In this case, first, the internal division ratio of the side of the triangle mesh of the reference viewpoint on the XY plane of the XYZ coordinate system, which is a two-dimensional space, is obtained.

Next, on the XY plane, the above-described internal division ratio is applied to the triangle mesh of the object positions corresponding to the three reference viewpoints, and the X coordinate and the Y coordinate of the position of the object corresponding to the listening position on the XY plane are obtained.

Moreover, the Z coordinate of the object corresponding to the listening position is obtained on the basis of the three-dimensional plane including the positions of the three objects corresponding to the three reference viewpoints in the three-dimensional space (XYZ coordinate system) and the X coordinate and the Y coordinate of the object at the listening position on the XY plane.

Here, an example of obtaining the object absolute coordinate position information indicating the object position F' and the gain information by the interpolation processing for the listening position F illustrated in FIG. 12 will be described with reference to FIGS. 13 to 15.

Figure 13:
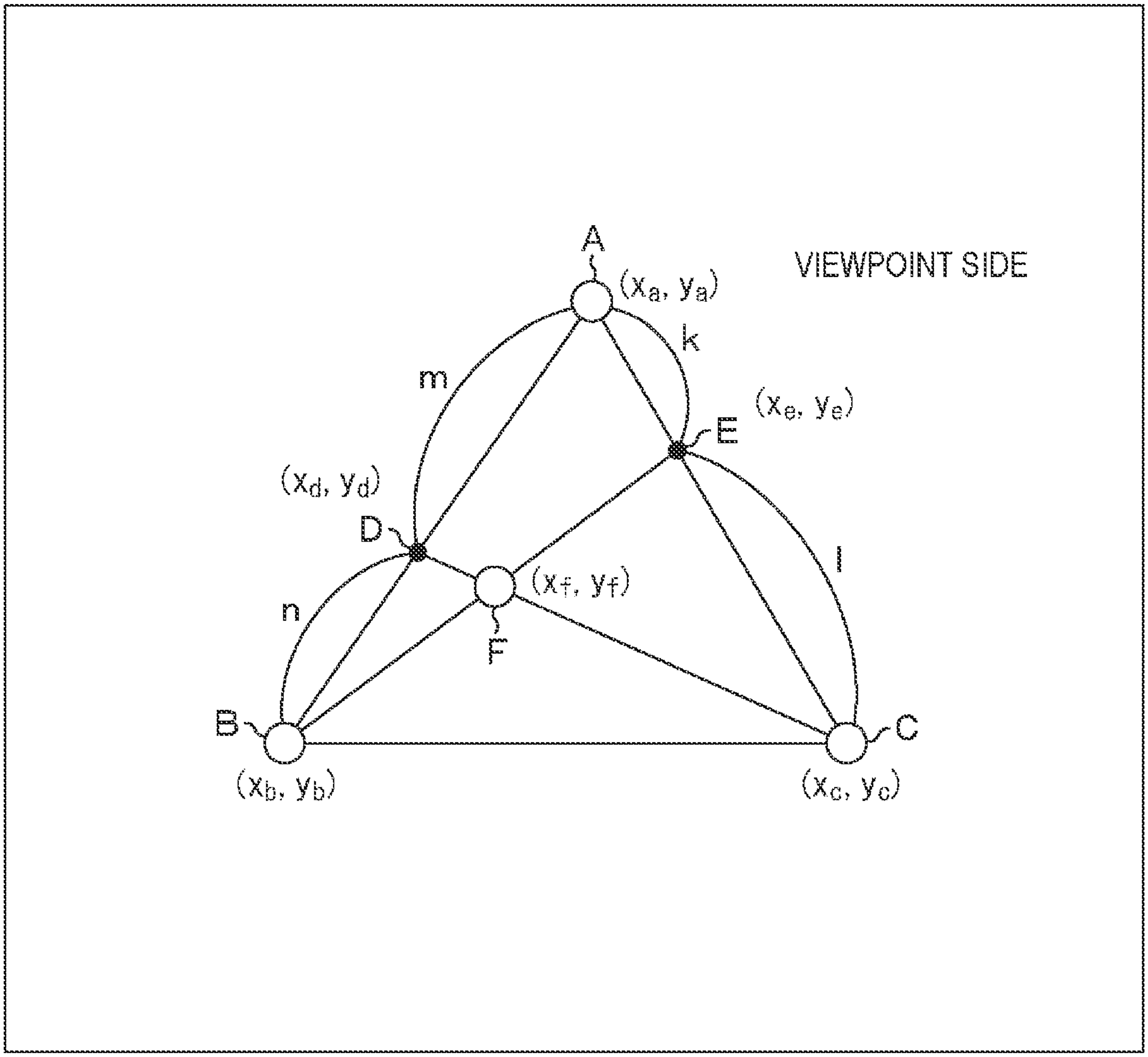
FIG. 13 is a diagram describing an internal division ratio in a viewpoint-side triangle mesh.

For example, as illustrated in FIG. 13, first, the X coordinate and the Y coordinate of the internally dividing point in the triangle mesh including the reference viewpoints A to C including the listening position F are obtained.

Now, an intersection of a straight line passing through the listening position F and the reference viewpoint C and a line segment AB from the reference viewpoint A to the reference viewpoint B is defined as a point D, and coordinates indicating the position of the point D on the XY plane are defined as ($x_d$, $y_d$). That is, the point D is an internally dividing point on the line segment AB (side AB).

At this time, the relationship indicated in Formula (9) described below is established for the X coordinate and the Y coordinate indicating the position of an arbitrary point on a line segment CF from the reference viewpoint C to the listening position F, and the X coordinate and the Y coordinate indicating the position of an arbitrary point on the line segment AB.

[Math. 9]

Line segment $CF$: $Y=\alpha_1 X-\alpha_1 x_c+y_c$, where $\alpha_1=(y_c-y_f)/(x_c-x_f)$ Line segment $AB$: $Y=\alpha_2 X-\alpha_2 x_a+y_a$, where $\alpha_2=(y_b-y_a)/(x_b-x_a)$ (9)

Furthermore, since the point D is an intersection of a straight line passing through the reference viewpoint C and the listening position F and the line segment AB, the coordinates ($x_d$, $y_d$) of the point D on the XY plane can be obtained from Formula (9), and the coordinates ($x_d$, $y_d$) are as indicated in Formula (10) described below.

[Math. 10]

$$x_d=(\alpha_1 x_c-y_c-\alpha_2 x_a+y_a)/(\alpha_1-\alpha_2)$$

$$y_d=\alpha_1 x_d-\alpha_1 x_c+y_c \quad (10)$$

Therefore, as indicated in Formula (11) described below, on the basis of the coordinates ($x_d$, $y_d$) of the point D, the coordinates ($x_a$, $y_a$) of the reference viewpoint A, and the coordinates ($x_b$, $y_b$) of the reference viewpoint B, the internal division ratio (m, n) of the line segment AB by the point D, that is, the division ratio can be obtained.

[Math. 11]

$$m=\mathrm{sqrt}((x_a-x_d)^2+(y_a-y_d)^2)$$

$$n=\mathrm{sqrt}((x_b-x_d)^2+(y_b-y_d)^2) \quad (11)$$

Similarly, an intersection of a straight line passing through the listening position F and the reference viewpoint B and a line segment AC from the reference viewpoint A to the reference viewpoint C is defined as a point E, and coordinates indicating the position of the point E on the XY plane are defined as ($x_e$, $y_e$). That is, the point E is an internally dividing point on the line segment AC (side AC).

At this time, the relationship indicated in Formula (12) described below is established for the X coordinate and the Y coordinate indicating the position of an arbitrary point on a line segment BF from the reference viewpoint B to the listening position F, and the X coordinate and the Y coordinate indicating the position of an arbitrary point on the line segment AC.

[Math. 12]

Line segment $BF$: $Y=\alpha_3 X-\alpha_3 x_b+y_b$, where $\alpha_3=(y_b-y_f)/(x_b-x_f)$ Line segment $AC$: $Y=\alpha_4 X-\alpha_4 x_a+y_a$, where $\alpha_4=(y_c-y_a)/(x_c-x_a)$ (12)

Furthermore, since the point E is an intersection of a straight line passing through the reference viewpoint B and the listening position F and the line segment AC, the coordinates ($x_e$, $y_e$) of the point E on the XY plane can be obtained from Formula (12), and the coordinates ($x_e$, $y_e$) are as indicated in Formula (13) described below.

[Math. 13]

$$x_e=(\alpha_3 x_b-y_b-\alpha_4 x_a+y_a)/(\alpha_3-\alpha_4)$$

$$y_e=\alpha_3 x_e-\alpha_3 x_b+y_b \quad (13)$$

Therefore, as indicated in Formula (14) described below, on the basis of the coordinates ($x_e$, $y_e$) of the point E, the coordinates ($x_a$, $y_a$) of the reference viewpoint A, and the coordinates ($x_e$, $y_e$) of the reference viewpoint C, the internal division ratio (k, l) of the line segment AC by the point E, that is, the division ratio can be obtained.

[Math. 14]

$$k==\mathrm{sqrt}((x_a-x_e)^2+(y_a-y_e)^2)$$

$$l=\mathrm{sqrt}(x_c-x_e)^2+(y_c-y_e)^2) \quad (14)$$

Figure 14:
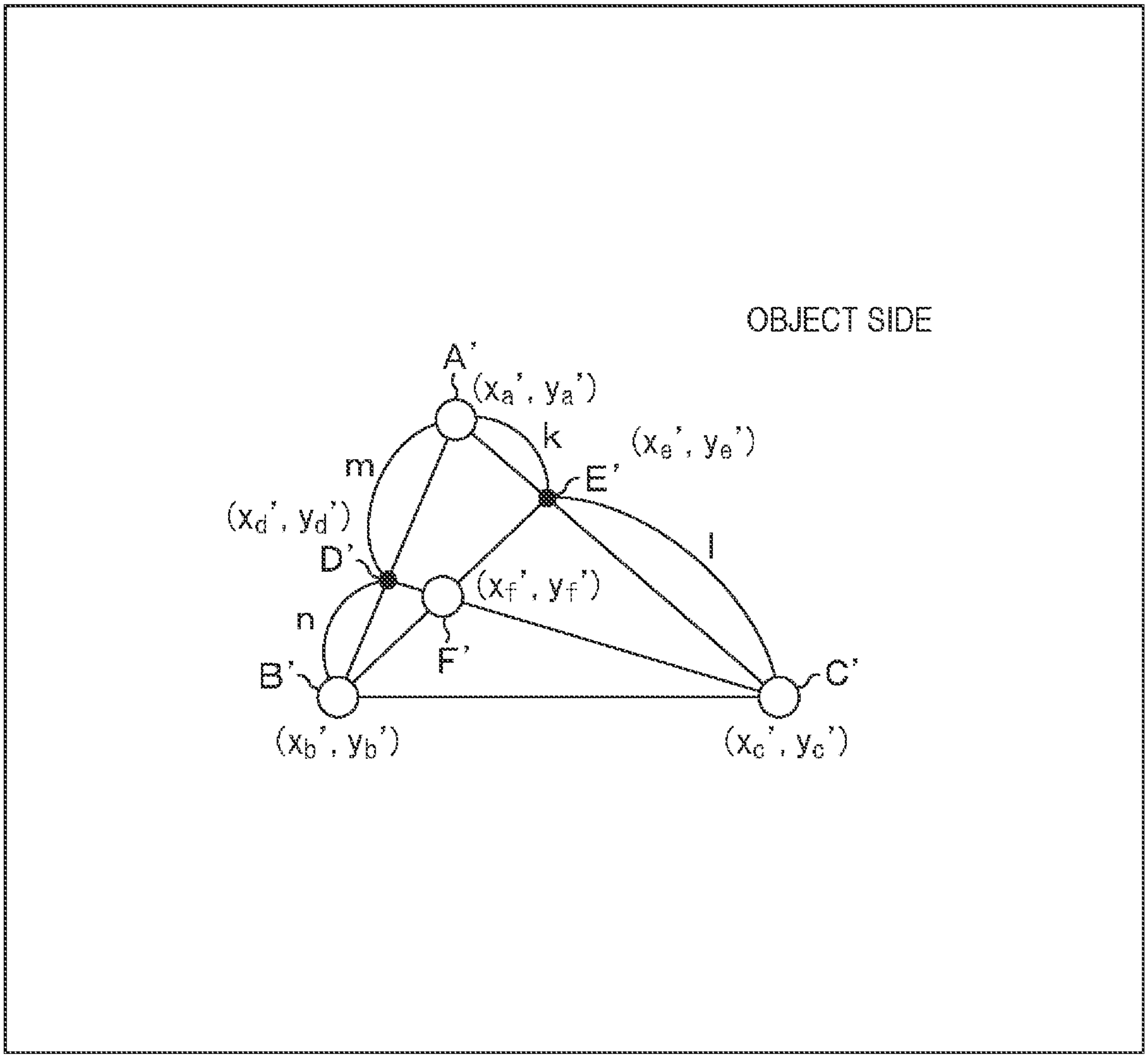
FIG. 14 is a diagram describing calculation of object position based on internal division ratio.

Next, by applying the ratios of the two sides obtained in this manner, that is, the internal division ratio (m, n) and the internal division ratio (k, l) to the object-side triangle mesh as illustrated in FIG. 14, the coordinates ($x_f'$, $y_f'$) of the object position F' on the XY plane are obtained.

Specifically, in this example, a point corresponding to the point D on a line segment A'B' connecting the object position A' and the object position B' is a point D'.

Similarly, a point corresponding to the point E on a line segment A'C' connecting the object position A' and the object position C' is a point E'.

Furthermore, an intersection between a straight line passing through the object position C' and the point D' and a straight line passing through the object position B' and the point E' is the object position F' corresponding to the listening position F.

Here, it is assumed that the internal division ratio of the line segment A'B' by the point D' is the same internal division ratio (m, n) as in the case of the point D. At this time, the coordinates ($x_d'$, $y_d'$) of the point D' on the XY plane can be obtained on the basis of the internal division ratio (m, n), the coordinates ($x_a'$, $y_e'$) of the object position A', and the coordinates ($x_b'$, $y_b'$) of the object position B' as indicated in Formula (15) described below.

[Math. 15]

$$x_d'=(nx_a'+mx_b')/(m+n)$$

$$y_d'=(ny_a'+my_b')/(m+n) \quad (15)$$

Furthermore, it is assumed that the internal division ratio of the line segment A'C' by the point E' is the same internal division ratio (k, l) as in the case of the point E. At this time, the coordinates ($x_e'$, $y_e'$) of the point E' on the XY plane can be obtained on the basis of the internal division ratio (k, l), the coordinates ($x_a'$, $y_e'$) of the object position A', and the coordinates ($x_c'$, $y_c'$) of the object position C' as indicated in Formula (16) described below.

[Math. 16]

$$x_e'=(lx_a'+kx_c')/(k+l)$$

$$y_e'=(ly_a'+ky_c')/(k+l) \quad (16)$$

Therefore, the relationship indicated in Formula (17) described below is established for the X coordinate and the Y coordinate indicating the position of an arbitrary point on a line segment B'E' from the object position B' to the point E', and the X coordinate and the Y coordinate indicating the position of an arbitrary point on a line segment C'D' from the object position C' to the point D'.

[Math. 17]

$$\text{Line segment } B'E':Y=\alpha_5X+y_b'-\alpha_5x_b',\text{where } \alpha_5=(y_e'-y_b')/(x_e'-x_b')$$

$$\text{Line segment } C'D':Y=\alpha_6X+y_c'-\alpha_6x_c',\text{where } \alpha_6=(y_d'-y_c')/(x_d'-x_c') \quad (17).$$

Since the target object position F' is the intersection of the line segment B'E' and the line segment C'D', the coordinates ($x_f'$, $y_f'$) of the object position F' can be obtained by Formula (18) described below from the relationship of Formula (17).

[Math. 18]

$$x_f'=(-y_b+\alpha_5x_b'-y_c'-\alpha_6x_c')/(\alpha_5-\alpha_6)$$

$$y_f'=\alpha_6x_f'+y_c'-\alpha_6x_c' \quad (18)$$

Through the above processing, the coordinates ($x_f'$, $y_f'$) of the object position F' on the XY plane are obtained.

Subsequently, the coordinates ($x_f'$, $y_f'$, $z_f'$) of the object position F' in the XYZ coordinate system are obtained on the basis of the coordinates ($x_f'$, $y_f'$) of the object position F' on the XY plane, the coordinates ($x_a'$, $y_a'$, $z_a'$) of the object position A', the coordinates ($x_b'$, $y_b'$, $z_b'$) of the object position B', and the coordinates ($x_c'$, $y_c'$, $z_c'$) of the object position C' in the XYZ coordinate system. That is, the Z coordinate $z_f'$ of the object position F' in the XYZ coordinate system is obtained.

For example, a triangle on a three-dimensional space having the object position A', the object position B', and the object position C' as vertices in the XYZ coordinate system (common absolute coordinate space), that is, a three-dimensional plane A'B'C' including the object position A', the object position B', and the object position C' is obtained. Then, a point having the X coordinate and the Y coordinate ($x_f'$, $y_f'$) on the three-dimensional plane A'B'C' is obtained, and the Z coordinate of the point is $z_f'$.

Specifically, a vector having the object position A' in the XYZ coordinate system as a start point and the object position B' as an end point is set as a vector A'B'=($x_{ab}'$, $y_{ab}'$, $z_{ab}'$).

Similarly, a vector having the object position A' in the XYZ coordinate system as a start point and the object position C' as an end point is set as a vector A'C'=($x_{ac}'$, $y_{ac}'$, $z_{ac}'$).

These vectors A'B' and A'C' can be obtained on the basis of the coordinates ($x_a'$, $y_a'$, $z_a'$) of the object position A', the coordinates ($x_b'$, $y_b'$, $z_b'$) of the object position B', and the coordinates ($x_c'$, $y_c'$, $z_c'$) of the object position C'. That is, the vectors A'B' and A'C' can be obtained by Formula (19) described below.

[Math. 19]

$$\text{Vector } A'B':(x_{ab}',y_{ab}',z_{ab}')=(x_b'-x_a',y_b'-y_a',z_b'-z_a')$$

$$\text{Vector } A'C':(x_{ac}',y_{ac}',z_{ac}')=(x_c'-x_a',y_c'-y_a',z_c'-z_a') \quad (19)$$

Furthermore, a normal vector (s, t, u) of the three-dimensional plane A'B'C' is an outer product of the vectors A'B' and A'C', and can be obtained by Formula (20) described below.

[Math. 20]

$$(s,t,u)=(y_{ab}'z_{ac}'-z_{ab}'y_{ac}',z_{ab}'x_{ac}'-x_{ab}'z_{ac}',x_{ab}'y_{ac}'-y_{ab}'x_{ac}') \quad (20)$$

Therefore, from the normal vector (s, t, u) and the coordinates ($x_a'$, $y_a'$, $z_a'$) of the object position A', the plane equation of the three-dimensional plane A'B'C' is as indicated in Formula (21) described below.

[Math. 21]

$$s(X-x_a')+t(Y-y_a')+u(Z-z_a')=0 \quad (21)$$

Here, since the X coordinate $x_f'$ and the Y coordinate $y_f'$ of the object position F' on the three-dimensional plane A'B'C' have already been obtained, the Z coordinate $z_f'$ can be obtained as indicated in Formula (21) described below by substituting the X coordinate $x_f'$ and the Y coordinate $y_f'$ into X and Y of the plane equation of Formula (22).

[Math. 22]

$$z_f'=(-s(x_f'-x_a')-t(y_f'-y_a'))/u+z_a' \quad (22)$$

Through the above calculation, the coordinates ($x_f'$, $y_f'$, $z_f'$) of the target object position F' are obtained. The object position calculation unit 48 outputs the object absolute coordinate position information indicating the coordinates ($x_f'$, $y_f'$, $z_f'$) of the object position F' obtained in the above manner.

Furthermore, similarly to the case of the object absolute coordinate position information, the gain information can also be obtained by three-point interpolation.

That is, the gain information of the object at the object position F' can be obtained by performing the interpolation processing on the basis of the gain information of the object when the viewpoint is at each of the reference viewpoints A to C.

Figure 15:
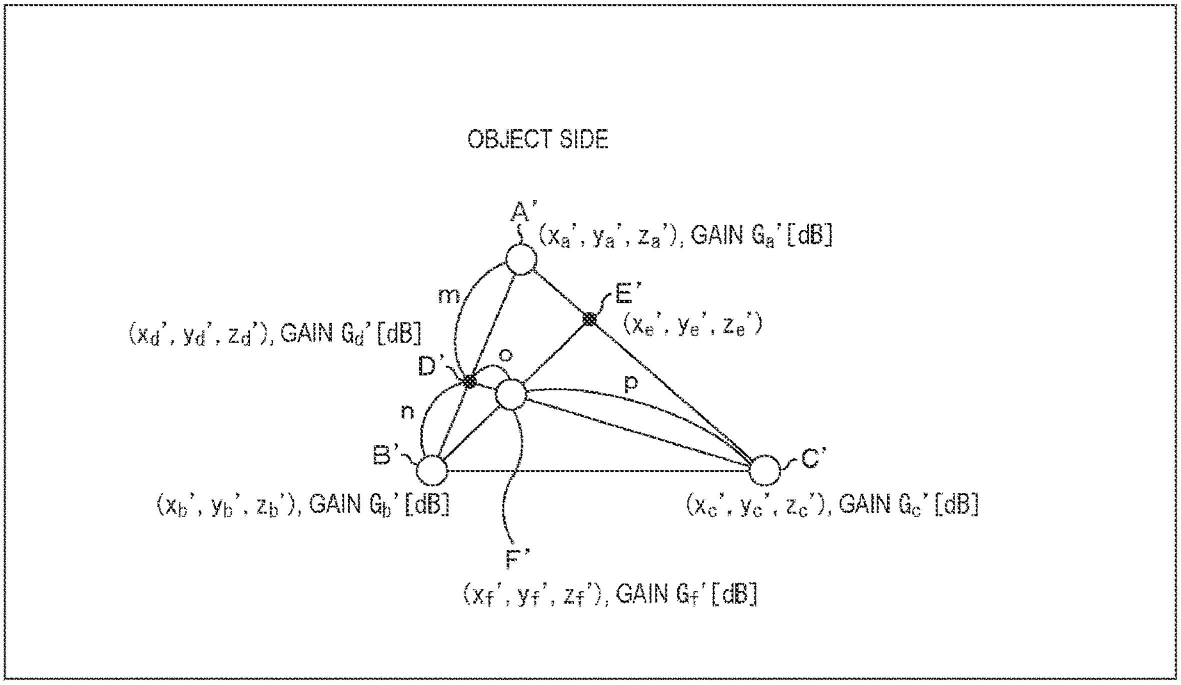
FIG. 15 is a diagram describing calculation of gain information based on internal division ratio.

For example, as illustrated in FIG. 15, it is considered to obtain a gain information $G_f'$ of the object at the object position F' in the triangle mesh formed by the object position A', the object position B', and the object position C'.

Now, it is assumed that the gain information of the object at the object position A' when the viewpoint is at the reference viewpoint A is $G_a'$, the gain information of the object at the object position B' is $G_b'$, and the gain information of the object at the object position C' is $G_c'$.

In this case, first, the gain information $G_d'$ of the object at the point D', which is the internally dividing point of the line segment A'B' when the viewpoint is virtually at the point D, is obtained.

Specifically, the gain information $G_d'$ can be obtained by calculating Formula (23) described below on the basis of the internal division ratio (m, n) of the above-described line segment A'B', and the gain information $G_a'$ of the object position A' and the gain information $G_b'$ of the object position B'.

[Math. 23]

$$G_d'=(m*G_b'+n*G_a')/(m+n) \quad (23)$$

That is, in Formula (23), the gain information $G_d'$ of the point D' is obtained by the interpolation processing based on the gain information $G_a'$ and the gain information $G_b'$.

Next, the interpolation processing is performed on the basis of the internal division ratio (o, p) of the line segment C'D' from the object position C' to the point D' by the object position F' and the gain information $G_c'$ of the object position C' and the gain information $G_d'$ of the point D', and the gain information Gf' of the object position F' is obtained. That is, the gain information $G_f'$ is obtained by performing the calculation of Formula (24) described below.

[Math. 24]

$$G_f'=(o*G_c'+p*G_d')/(o+p)$$

where $$o=\mathrm{SQRT}((x_d'-x_f')^2+(y_d'-y_f')^2+(z_d'-z_f')^2)$$

$$p=\mathrm{SQRT}((x_c'-x_f')^2+(y_c'-y_f')^2+(z_c'-z_f')^2) \quad (24)$$

The gain information $G_f'$ thus obtained is output from the object position calculation unit 48 as the gain information of the object corresponding to the listening position F.

By performing the three-point interpolation as described above, the object absolute coordinate position information and the gain information can be obtained for an arbitrary listening position.

Meanwhile, in a case where the three-point interpolation is performed, when there are four or more reference viewpoints in the common absolute coordinate space, a plurality of triangle meshes can be configured by a combination of selected three of the reference viewpoints.

Figure 16:
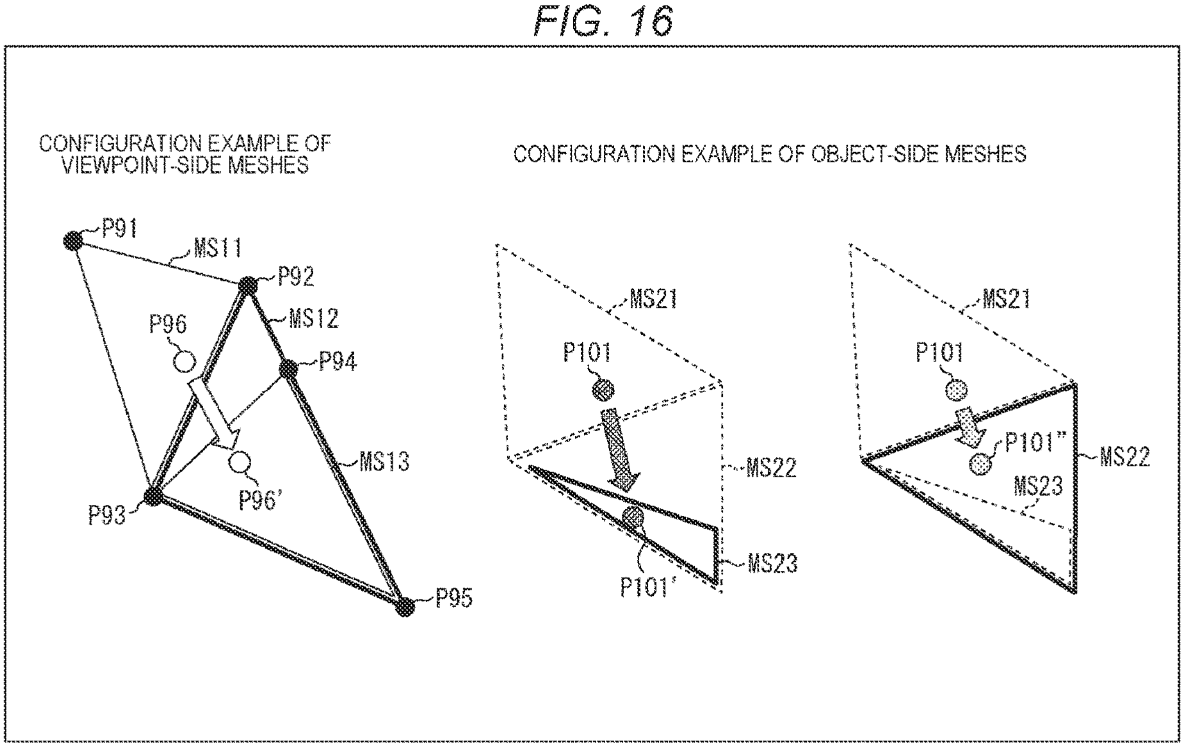
FIG. 16 is a diagram describing selection of a triangle mesh.

For example, as illustrated on the left side of FIG. 16, it is assumed that there are reference viewpoints at five positions P91 to P95.

In such a case, a plurality of triangle meshes such as triangle meshes MS11 to MS13 is formed (configured).

Here, the triangle mesh MS11 is formed by positions P91 to P93, which are reference viewpoints, the triangle mesh MS12 is formed by positions P92, P93, and P95, and the triangle mesh MS13 is formed by positions P93, P94, and P95.

The listener can freely move in a region surrounded by the triangle meshes MS11 to MS13, that is, a region surrounded by all the reference viewpoints.

Therefore, along with the movement of the listener, that is, the movement (change) of the listening position, the triangle mesh for obtaining the object absolute coordinate position information and the gain information at the listening position is switched.

Note that, hereinafter, the viewpoint-side triangle mesh for obtaining the object absolute coordinate position information and the gain information at the listening position is also referred to as a selected triangle mesh. Furthermore, the object-side triangle mesh corresponding to the viewpoint-side selected triangle mesh is also appropriately referred to as a selected triangle mesh.

The left side of FIG. 16 illustrates an example in which the listening position that was originally at the position P96 has moved thereafter to a position P96'. That is, the position P96 is the position (listening position) of the viewpoint of the listener before the movement, and the position P96' is the position of the viewpoint of the listener after the movement.

In a case where a triangle mesh for which the three-point interpolation is performed is selected, basically, a sum (total) of distances from the listening position to the respective vertices of the triangle mesh is obtained as a total distance, and a triangle mesh having the smallest total distance among the triangle meshes including the listening position is selected as the selected triangle mesh.

That is, basically, the selected triangle mesh is determined by condition processing of selecting the triangle mesh having the smallest total distance from the triangle meshes including the listening position. Hereinafter, the condition that the total distance is the smallest among the triangle meshes including the listening position is also particularly referred to as a viewpoint-side selection condition.

When the three-point interpolation is performed, basically, a triangle mesh satisfying such viewpoint-side selection condition is selected as the selected triangle mesh.

Thus, in the example illustrated on the left side of FIG. 16, when the listening position is at the position P96, the triangle mesh MS11 is selected as the selected triangle mesh, and when the listening position moves to the position P96', the triangle mesh MS13 is selected as the selected triangle mesh.

However, when a triangle mesh having the smallest total distance is simply selected as the selected triangle mesh, discontinuous transition of the object position, that is, jump of the position of the object may occur.

For example, as illustrated in the center of FIG. 16, it is assumed that there are triangle meshes MS21 to MS23 as object-side triangle meshes, that is, triangle meshes including object positions corresponding to each reference viewpoint.

In this example, the triangle mesh MS21 and the triangle mesh MS22 are adjacent to each other, and the triangle mesh MS22 and the triangle mesh MS23 are also adjacent to each other.

That is, the triangle mesh MS21 and the triangle mesh MS22 have a side common to each other, and the triangle mesh MS22 and the triangle mesh MS23 also have a side common to each other. Hereinafter, a common side of two adjacent triangle meshes is also particularly referred to as a common side.

On the other hand, since the triangle mesh MS21 and the triangle mesh MS23 are not adjacent to each other, the two triangle meshes do not have a common side.

Here, it is assumed that the triangle mesh MS21 is an object-side triangle mesh corresponding to the viewpoint-side triangle mesh MS11. That is, it is assumed that a triangle mesh having each of the object positions of the same object as a vertex when the viewpoint (listening position) is at each of the positions P91 to P93, which are the reference viewpoints, is the triangle mesh MS21.

Similarly, the triangle mesh MS22 is an object-side triangle mesh corresponding to the viewpoint-side triangle mesh MS12, and the triangle mesh MS23 is an object-side triangle mesh corresponding to the viewpoint-side triangle mesh MS13.

For example, it is assumed that the listening position moves from the position P96 to the position P96', so that the viewpoint-side selected triangle mesh is switched from the triangle mesh MS11 to the triangle mesh MS13. In this case, on the object side, the selected triangle mesh is switched from the triangle mesh MS21 to the triangle mesh MS23.

In the center example in the drawing, a position P101 indicates an object position when the listening position is at the position P96, the object position being obtained by performing the three-point interpolation using the triangle mesh MS21 as the selected triangle mesh. Similarly, a position P101' indicates an object position when the listening position is at the position P96', the object position being obtained by performing the three-point interpolation using the triangle mesh MS23 as the selected triangle mesh.

Therefore, in this example, when the listening position moves from the position P96 to the position P96', the object position moves from the position P101 to the position P101'.

However, in this case, the triangle mesh MS21 including the position P101 and the triangle mesh MS23 including the position P101' are not adjacent to each other and do not have a common side common to each other. In other words, the object position moves (transitions) across the triangle mesh MS22 present between the triangle meshes.

Therefore, in such a case, discontinuous movement (transition) of the object position occurs. This is because the triangle mesh MS21 and the triangle mesh MS23 do not have a common side, and thus the scale (measure) of the relationship of the object positions corresponding to the respective reference viewpoints is different between the triangle meshes.

On the other hand, when the object-side selected triangle meshes have a common side, before and after the movement of the listening position, the continuity of the scale is maintained between the selected triangle meshes before and after the movement, and the occurrence of the discontinuous transition of the object position can be suppressed.

Therefore, in a case where the three-point interpolation is performed, it is sufficient if not only the above-described basic condition processing, but also condition processing of selecting the viewpoint-side selected triangle mesh after the movement so that the object-side selected triangle meshes have a common side before and after the movement of the listening position is added.

In other words, it is sufficient if the selected triangle mesh to be used for the three-point interpolation at the viewpoint after the movement is selected on the basis of the relationship between the object-side selected triangle mesh used for the three-point interpolation at the viewpoint (listening position) before the movement and the object-side triangle mesh corresponding to the viewpoint-side triangle mesh including the viewpoint position (listening position) after the movement.

Hereinafter, the condition that the object-side triangle mesh before the movement of the listening position and the object-side triangle mesh after the movement of the listening position have a common side is also particularly referred to as an object-side selection condition.

In a case where the three-point interpolation is performed, it is sufficient if, among the viewpoint-side triangle meshes that satisfy the object-side selection condition, a triangle mesh that further satisfies the viewpoint-side selection condition is selected as the selected triangle mesh. However, in a case where there is no viewpoint-side triangle mesh that satisfies the object-side selection condition, a triangle mesh that only satisfies the viewpoint-side selection condition is selected as the selected triangle mesh.

As described above, when the viewpoint-side selected triangle mesh is selected so as to satisfy not only the viewpoint-side selection condition but also the object-side selection condition, it is possible to suppress the occurrence of discontinuous movement of the object position and realize higher quality acoustic reproduction.

In this case, for example, in the example illustrated on the left side of FIG. 16, when the listening position moves from the position P96 to the position P96', the triangle mesh MS12 is selected as the viewpoint-side selected triangle mesh with respect to the position P96', which is the listening position after the movement.

For example, as illustrated on the right side of FIG. 16, the object-side triangle mesh MS21 corresponding to the viewpoint-side triangle mesh MS11 before the movement and the object-side triangle mesh MS22 corresponding to the viewpoint-side triangle mesh MS12 after the movement have a common side. Therefore, in this case, it can be seen that the object-side selection condition is satisfied.

Furthermore, a position P101" indicates an object position when the listening position is at the position P96', the object position being obtained by performing the three-point interpolation using the triangle mesh MS22 as the object-side selected triangle mesh.

Therefore, in this example, when the listening position moves from the position P96 to the position P96', the position of the object corresponding to the listening position also moves from the position P101 to the position P101".

In this case, since the triangle mesh MS21 and the triangle mesh MS22 have a common side, discontinuous movement of the object position does not occur before and after the movement of the listening position.

For example, in this example, the positions of both ends of the common side of the triangle mesh MS21 and the triangle mesh MS22, that is, the object position corresponding to the position P92, which is the reference viewpoint, and the object position corresponding to the position P93, which is the reference viewpoint, are the same position before and after the movement of the listening position.

As described above, in the example illustrated in FIG. 16, even when the listening position is the same position at the position P96', the object position, that is, the position where the object is projected varies depending on which of the triangle mesh MS12 and the triangle mesh MS13 is selected as the viewpoint-side selected triangle mesh.

Therefore, by selecting a more appropriate triangle mesh from among the triangle meshes including the listening position, it is possible to suppress the occurrence of discontinuous movement of the object position, that is, the sound image position, and to realize higher quality acoustic reproduction.

Furthermore, by combining the three-point interpolation using a triangle mesh including three reference viewpoints surrounding the listening position and selection of the triangle mesh according to the selection condition, it is possible to realize object arrangement in consideration of the reference viewpoint for an arbitrary listening position in the common absolute coordinate space.

Note that, also in a case where the three-point interpolation is performed, similar to the case where the two-point interpolation is performed, the interpolation processing weighted on the basis of the bias coefficient α may be appropriately performed to obtain the final object absolute coordinate position information and the gain information.

<Configuration Example of the Content Reproduction System>

Here, a more detailed embodiment of the content reproduction system to which the present technology described above is applied will be described.

Figure 17:
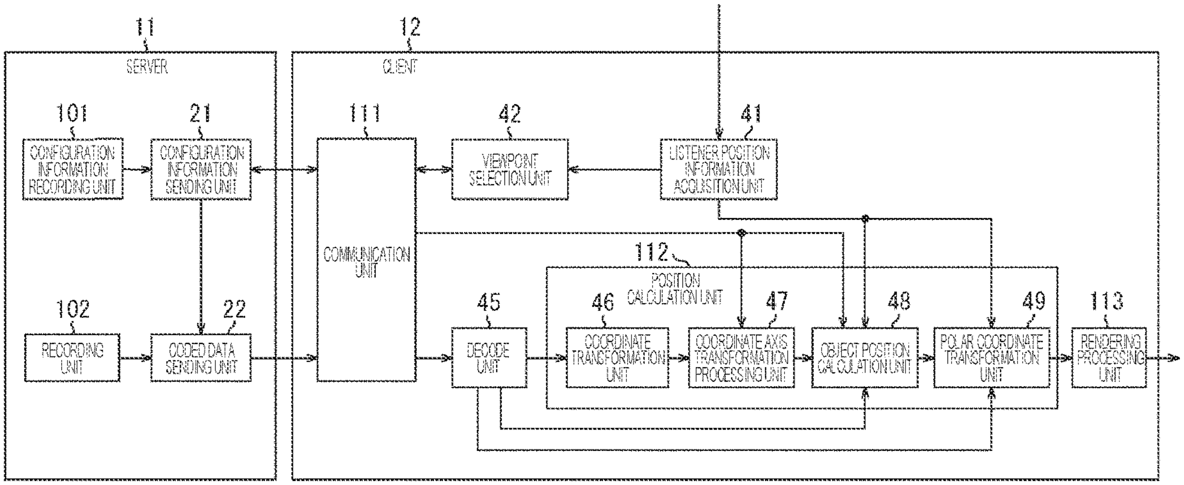
FIG. 17 is a diagram illustrating a configuration of a content reproduction system.

FIG. 17 is a diagram illustrating a configuration example of the content reproduction system to which the present technology has been applied. Note that portions in FIG. 17 corresponding to those of FIG. 1 are designated by the same reference numerals, and description is omitted as appropriate.

The content reproduction system illustrated in FIG. 17 includes a server 11 that distributes content and a client 12 that receives distribution of content from the server 11.

Furthermore, the server 11 includes a configuration information recording unit 101, a configuration information sending unit 21, a recording unit 102, and a coded data sending unit 22.

The configuration information recording unit 101 records, for example, the system configuration information illustrated in FIG. 4 prepared in advance, and supplies the recorded system configuration information to the configuration information sending unit 21. Note that a part of the recording unit 102 may be the configuration information recording unit 101.

The recording unit 102 records, for example, coded audio data obtained by coding audio data of an object constituting content, object polar coordinate coded data of each object for each reference viewpoint, coded gain information, and the like.

The recording unit 102 supplies the coded audio data, the object polar coordinate coded data, the coded gain information, and the like recorded in response to a request or the like to the coded data sending unit 22.

Furthermore, the client 12 includes a listener position information acquisition unit 41, a viewpoint selection unit 42, a communication unit 111, a decode unit 45, a position calculation unit 112, and a rendering processing unit 113.

The communication unit 111 corresponds to the configuration information acquisition unit 43 and the coded data acquisition unit 44 illustrated in FIG. 1, and transmits and receives various data by communicating with the server 11.

For example, the communication unit 111 transmits the viewpoint selection information supplied from the viewpoint selection unit 42 to the server 11, and receives the system configuration information and the bitstream transmitted from the server 11. That is, the communication unit 111 functions as a reference viewpoint information acquisition unit that acquires the system configuration information and the object polar coordinate coded data and the coded gain information included in the bitstream from the server 11.

The position calculation unit 112 generates the polar coordinate position information indicating the position of the object on the basis of the object polar coordinate position information supplied from the decode unit 45 and the system configuration information supplied from the communication unit 111, and supplies the polar coordinate position information to the rendering processing unit 113.

Furthermore, the position calculation unit 112 performs gain adjustment on the audio data of the object supplied from the decode unit 45, and supplies the audio data after the gain adjustment to the rendering processing unit 113.

The position calculation unit 112 includes a coordinate transformation unit 46, a coordinate axis transformation processing unit 47, an object position calculation unit 48, and a polar coordinate transformation unit 49.

The rendering processing unit 113 performs the rendering processing such as VBAP or the like on the basis of the polar coordinate position information supplied from the polar coordinate transformation unit 49 and the audio data and generates and outputs reproduction audio data for reproducing the sound of the content.

<Description of Provision Processing and Reproduction Audio Data Generation Processing>

Subsequently, the operation of the content reproduction system illustrated in FIG. 17 will be described.

Figure 18:
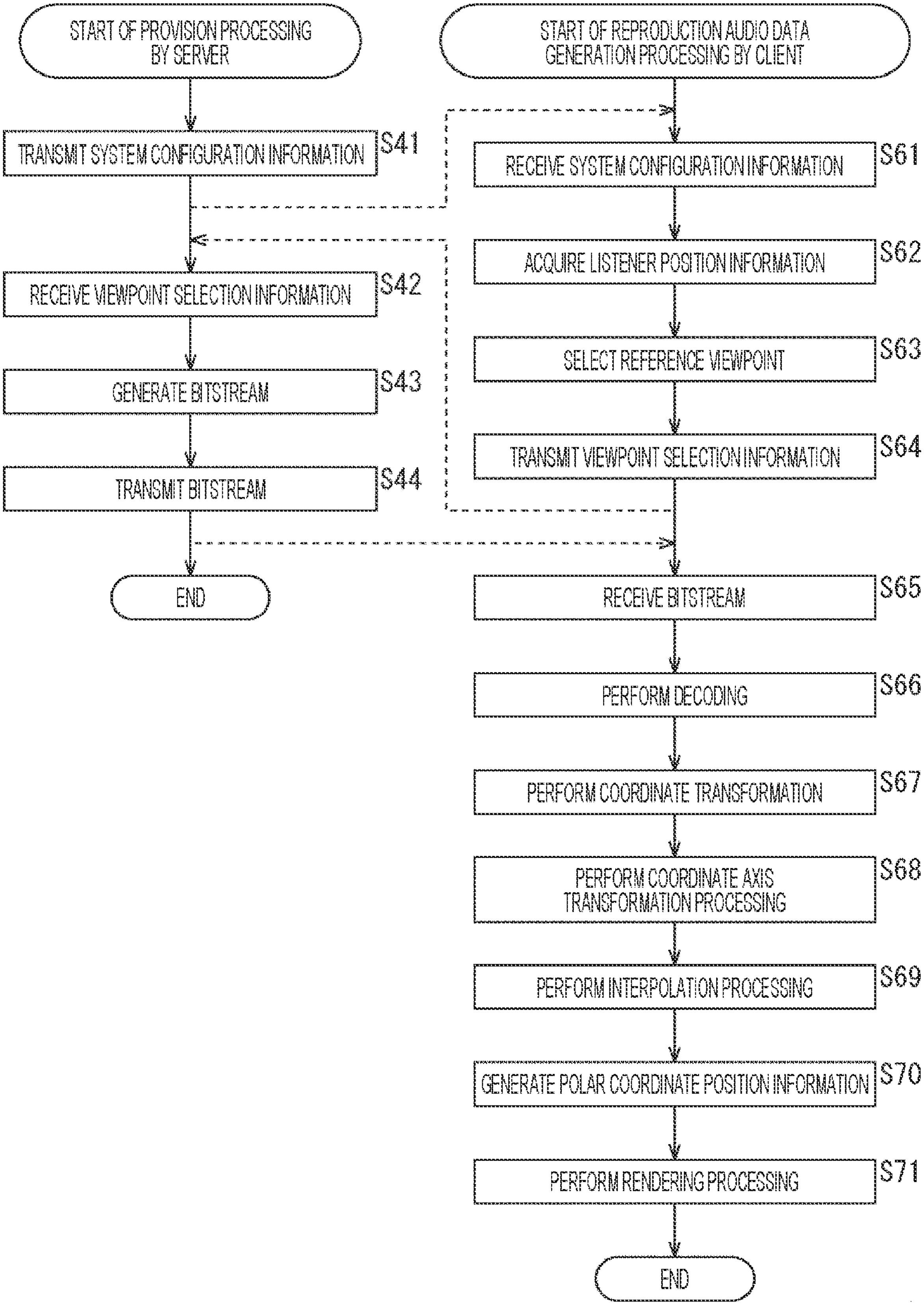
FIG. 18 is a flowchart describing provision processing and reproduction audio data generation processing.

That is, the provision processing by the server 11 and the reproduction audio data generation processing by the client 12 will be described below with reference to the flowchart of FIG. 18.

For example, when distribution of predetermined content is requested from the client 12 to the server 11, the server 11 starts the provision processing and performs the processing of step S41.

That is, in step S41, the configuration information sending unit 21 reads the system configuration information of the requested content from the configuration information recording unit 101, and transmits the read system configuration information to the client 12. For example, the system configuration information is prepared in advance, and is transmitted to the client 12 via a network or the like immediately after the operation of the content reproduction system is started, that is, for example, immediately after the connection between the server 11 and the client 12 is established and before the coded audio data or the like is transmitted.

Then, in step S61, the communication unit 111 of the client 12 receives the system configuration information transmitted from the server 11 and supplies the system configuration information to the viewpoint selection unit 42, the coordinate axis transformation processing unit 47, and the object position calculation unit 48.

Note that the timing at which the communication unit 111 acquires the system configuration information from the server 11 may be any timing as long as it is before the start of reproduction of the content.

In step S62, the listener position information acquisition unit 41 acquires the listener position information according to an operation of the listener or the like, and supplies the listener position information to the viewpoint selection unit 42, the object position calculation unit 48, and the polar coordinate transformation unit 49.

In step S63, the viewpoint selection unit 42 selects two or more reference viewpoints on the basis of the system configuration information supplied from the communication unit 111 and the listener position information supplied from the listener position information acquisition unit 41, and supplies viewpoint selection information indicating the selection result to the communication unit 111.

For example, in a case where two reference viewpoints are selected for the listening position indicated by the listener position information, two reference viewpoints sandwiching the listening position are selected from among the plurality of reference viewpoints indicated by the system configuration information. That is, the reference viewpoints are selected such that the listening position is located on a line segment connecting the selected two reference viewpoints.

Furthermore, in a case where the three-point interpolation is performed in the object position calculation unit 48, three or more reference viewpoints around the listening position indicated by the listener position information are selected from among the plurality of reference viewpoints indicated by the system configuration information.

In step S64, the communication unit 111 transmits the viewpoint selection information supplied from the viewpoint selection unit 42 to the server 11.

Then, the processing of SU42 is performed in the server 11. That is, in step S42, the configuration information sending unit 21 receives the viewpoint selection information transmitted from the client 12 and supplies the viewpoint selection information to the coded data sending unit 22.

The coded data sending unit 22 reads the object polar coordinate coded data and the coded gain information of the reference viewpoint indicated by the viewpoint selection information supplied from the configuration information sending unit 21 from the recording unit 102 for each object, and also reads the coded audio data of each object of the content.

In step S43, the coded data sending unit 22 multiplexes the object polar coordinate coded data, the coded gain information, and the coded audio data read from the recording unit 102 to generate a bitstream.

In step S44, the coded data sending unit 22 transmits the generated bitstream to the client 12, and the provision processing ends. Therefore, the content is distributed to the client 12.

Furthermore, when the bitstream is transmitted, the client 12 performs the processing of step S65. That is, in step S65, the communication unit 111 receives the bitstream transmitted from the server 11 and supplies the bitstream to the decode unit 45.

In step S66, the decode unit 45 extracts the object polar coordinate coded data, the coded gain information, and the coded audio data from the bitstream supplied from the communication unit 111 and decodes the object polar coordinate coded data, the coded gain information, and the coded audio data.

The decode unit 45 supplies the object polar coordinate position information obtained by decoding to the coordinate transformation unit 46, supplies the gain information obtained by decoding to the object position calculation unit 48, and moreover supplies the audio data obtained by decoding to the polar coordinate transformation unit 49.

In step S67, the coordinate transformation unit 46 performs coordinate transformation on the object polar coordinate position information of each object supplied from the decode unit 45, and supplies the resultant object absolute coordinate position information to the coordinate axis transformation processing unit 47.

For example, in step S67, for each reference viewpoint, Formula (1) described above is calculated on the basis of the object polar coordinate position information for each object, and the object absolute coordinate position information is calculated.

In step S68, the coordinate axis transformation processing unit 47 performs coordinate axis transformation processing on the object absolute coordinate position information supplied from the coordinate transformation unit 46 on the basis of the system configuration information supplied from the communication unit 111.

The coordinate axis transformation processing unit 47 performs coordinate axis transformation processing for each object for each reference viewpoint, and supplies the resultant object absolute coordinate position information indicating the position of the object in the common absolute coordinate system to the object position calculation unit 48. For example, in step S68, calculation similar to Formula (3) described above is performed to calculate the object absolute coordinate position information.

In step S69, the object position calculation unit 48 performs the interpolation processing on the basis of the system configuration information supplied from the communication unit 111, the listener position information supplied from the listener position information acquisition unit 41, the object absolute coordinate position information supplied from the coordinate axis transformation processing unit 47, and the gain information supplied from the decode unit 45.

In step S69, the above-described two-point interpolation or three-point interpolation is performed as the interpolation processing for each object, and the final object absolute coordinate position information and the gain information are calculated.

For example, in a case where the two-point interpolation is performed, the object position calculation unit 48 obtains the proportion ratio (m:n) by performing calculation similar to Formula (4) described above on the basis of the reference viewpoint position information included in the system configuration information and the listener position information.

Then, the object position calculation unit 48 performs the interpolation processing of the two-point interpolation by performing calculation similar to Formula (5) described above on the basis of the obtained proportion ratio (m:n) and the object absolute coordinate position information and the gain information of the two reference viewpoints.

Note that by performing calculation similar to Formula (6) or (7) instead of Formula (5), the interpolation processing (two-point interpolation) may be performed by weighting the object absolute coordinate position information and the gain information of a desired reference viewpoint.

Furthermore, for example, in a case where the three-point interpolation is performed, the object position calculation unit 48 selects three reference viewpoints for forming (configuring) a triangle mesh that satisfies viewpoint-side and object-side selection conditions on the basis of the listener position information, the system configuration information, and the object absolute coordinate position information of each reference viewpoint. Then, the object position calculation unit 48 performs the three-point interpolation on the basis of the object absolute coordinate position information and the gain information of the selected three reference viewpoints.

That is, the object position calculation unit 48 obtains the internal division ratio (m, n) and the internal division ratio (k, l) by performing calculation similar to Formulae (9) to (14) described above on the basis of the reference viewpoint position information included in the system configuration information and the listener position information.

Then, the object position calculation unit 48 performs the interpolation processing of the three-point interpolation by performing calculation similar to Formulae (15) to (24) described above on the basis of the obtained internal division ratio (m, n) and internal division ratio (k, l) and the object absolute coordinate position information and the gain information of each reference viewpoint. Note that also in a case where the three-point interpolation is performed, the interpolation processing (three-point interpolation) may be performed by weighting the object absolute coordinate position information and the gain information of a desired reference viewpoint.

When the interpolation processing is performed in this manner and the final object absolute coordinate position information and the gain information are obtained, the object position calculation unit 48 supplies the obtained object absolute coordinate position information and gain information to the polar coordinate transformation unit 49.

In step S70, the polar coordinate transformation unit 49 performs the polar coordinate transformation on the object absolute coordinate position information supplied from the object position calculation unit 48 on the basis of the listener position information supplied from the listener position information acquisition unit 41 to generate the polar coordinate position information.

Furthermore, the polar coordinate transformation unit 49 performs the gain adjustment on the audio data of each object supplied from the decode unit 45 on the basis of the gain information of each object supplied from the object position calculation unit 48.

The polar coordinate transformation unit 49 supplies the polar coordinate position information obtained by the polar coordinate transformation and the audio data of each object obtained by the gain adjustment to the rendering processing unit 113.

In step S71, the rendering processing unit 113 performs the rendering processing such as VBAP or the like on the basis of the polar coordinate position information of each object supplied from the polar coordinate transformation unit 49 and the audio data, and outputs the resultant reproduction audio data.

For example, with a speaker or the like in the subsequent stage of the rendering processing unit 113, the sound of the content is reproduced on the basis of the reproduction audio data. When the reproduction audio data is generated and output in this manner, the reproduction audio data generation processing ends.

Note that the rendering processing unit 113 or the polar coordinate transformation unit 49 may perform processing corresponding to the reproduction mode on the audio data of the object on the basis of the listener position information and the information indicating the reproduction mode included in the system configuration information before the rendering processing.

In such a case, for example, attenuation processing such as gain adjustment is performed on the audio data of the object located at a position overlapping with the listening position, or the audio data is replaced with zero data and muted. Furthermore, for example, the sound of the audio data of the object located at a position overlapping with the listening position is output from all channels (speakers).

Furthermore, the provision processing and the reproduction audio data generation processing described above are performed for each frame of content.

However, the processing in steps S41 and S61 can be performed only at the start of reproduction of the content. Moreover, the processing of step S42 and steps S62 to S64 is not necessarily performed for each frame.

As described above, the server 11 receives the viewpoint selection information, generates the bitstream including the information of the reference viewpoint corresponding to the viewpoint selection information, and transmits the bitstream to the client 12. Furthermore, the client 12 performs the interpolation processing on the basis of the information of each reference viewpoint included in the received bitstream, and obtains the object absolute coordinate position information and the gain information of each object.

In this way, it is possible to realize the object arrangement based on the intention of the content creator according to the listening position instead of the simple physical relationship between the listener and the object. Therefore, content reproduction based on the intention of the content creator can be realized, and the interest of the content can be sufficiently conveyed to the listener.

<Description of the Viewpoint Selection Processing>

Furthermore, as described above, in the reproduction audio data generation processing described with reference to FIG. 18, in a case where the three-point interpolation is performed in step S69, three reference viewpoints for performing the three-point interpolation are selected.

Figure 19:
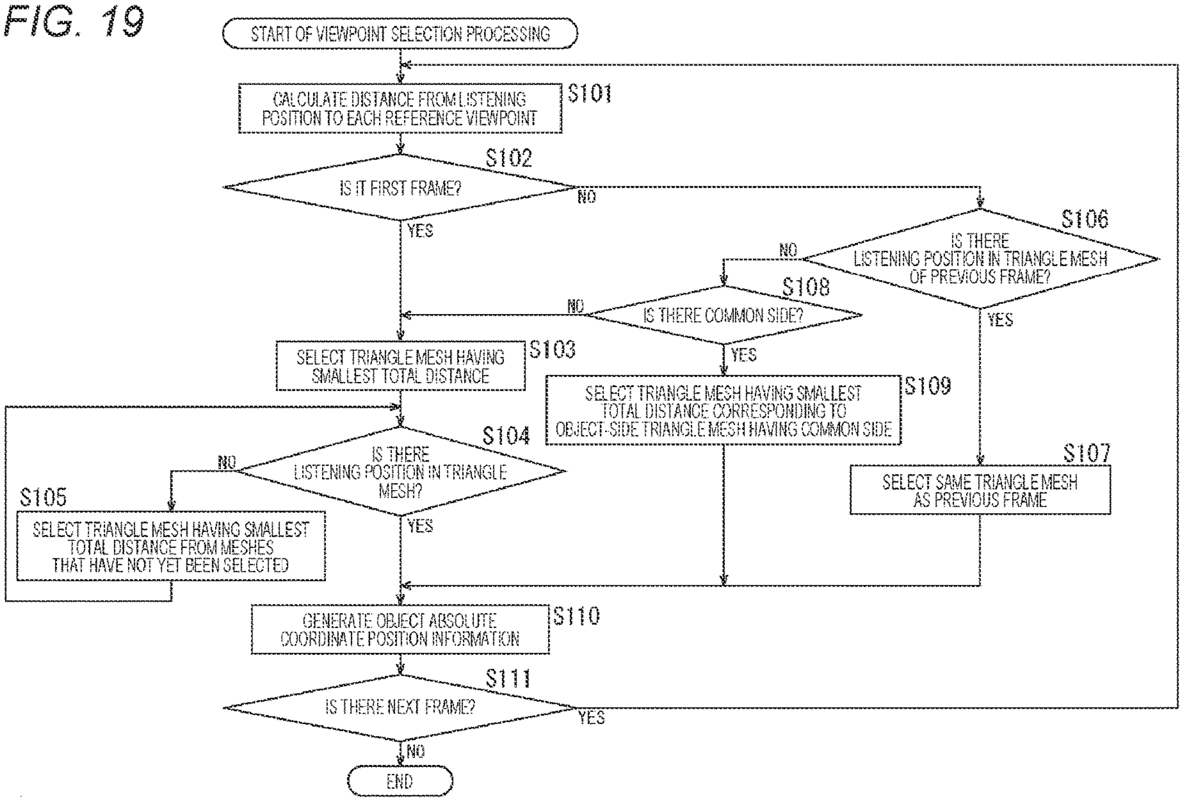
FIG. 19 is a flowchart describing viewpoint selection processing.

Hereinafter, the viewpoint selection processing that is processing in which the client 12 selects three reference viewpoints in a case where the three-point interpolation is performed will be described with reference to the flowchart of FIG. 19. This viewpoint selection processing corresponds to the processing of step S69 of FIG. 18.

In step S101, the object position calculation unit 48 calculates the distance from the listening position to each of the plurality of reference viewpoints on the basis of the listener position information supplied from the listener position information acquisition unit 41 and the system configuration information supplied from the communication unit 111.

In step S102, the object position calculation unit 48 determines whether or not the frame (hereinafter, also referred to as a current frame) of the audio data for which the three-point interpolation is to be performed is the first frame of the content.

In a case where it is determined in step S102 that the frame is the first frame, the processing proceeds to step S103.

In step S103, the object position calculation unit 48 selects a triangle mesh having the smallest total distance from among triangle meshes including arbitrary three reference viewpoints among the plurality of reference viewpoints. Here, the total distance is the sum of distances from the listening position to the reference viewpoints constituting the triangle mesh.

In step S104, the object position calculation unit 48 determines whether or not the listening position is within (included in) the triangle mesh selected in step S103.

In a case where it is determined in step S104 that the listening position is not in the triangle mesh, since the triangle mesh does not satisfy the viewpoint-side selection condition, thereafter, the processing proceeds to step S105.

In step S105, the object position calculation unit 48 selects a triangle mesh having the smallest total distance from among the viewpoint-side triangle meshes that have not yet been selected in the processing of steps S103 and S105 that have been performed so far for the frame to be processed.

When a new viewpoint-side triangle mesh is selected in step S105, thereafter, the processing returns to step S104, and the above-described processing is repeatedly performed until it is determined that the listening position is within the triangle mesh. That is, a triangle mesh satisfying the viewpoint-side selection condition is searched.

On the other hand, in a case where it is determined in step S104 that the listening position is within the triangle mesh, the triangle mesh is selected as a triangle mesh for which the three-point interpolation is performed, and thereafter, the processing proceeds to step S110.

Furthermore, in a case where it is determined in step S102 that the frame is not the first frame, thereafter, the processing of step S106 is performed.

In step S106, the object position calculation unit 48 determines whether or not the current listening position is in the viewpoint-side triangle mesh selected in the frame (hereinafter, also referred to as a previous frame) immediately before the current frame.

In a case where it is determined in step S106 that the listening position is within the triangle mesh, thereafter, the processing proceeds to step S107.

In step S107, the object position calculation unit 48 selects the same viewpoint-side triangle mesh, which has been selected for the three-point interpolation in the previous frame, as the triangle mesh for which the three-point interpolation is performed also in the current frame. When the triangle mesh for the three-point interpolation, that is, the three reference viewpoints are selected in this manner, thereafter, the processing proceeds to step S110.

Furthermore, in a case where it is determined in step S106 that the listening position is not in the viewpoint-side triangle mesh selected in the previous frame, thereafter, the processing proceeds to step S108.

In step S108, the object position calculation unit 48 determines whether or not there is a triangle mesh having (including) a common side with the object-side selected triangle mesh in the previous frame among the object-side triangle meshes in the current frame. The determination processing in step S108 is performed on the basis of the system configuration information and the object absolute coordinate position information.

In a case where it is determined in step S108 that there is no triangle mesh having a common side, since there is no triangle mesh satisfying the object-side selection condition, thereafter, the processing proceeds to step S103. In this case, the triangle mesh satisfying only the viewpoint-side selection condition is selected for the three-point interpolation in the current frame.

Furthermore, in a case where it is determined in step S108 that there is a triangle mesh having a common side, thereafter, the processing proceeds to step S109.

In step S109, the object position calculation unit 48 selects a triangle mesh including the listening position and having the smallest total distance as the triangle mesh for the three-point interpolation from among the viewpoint-side triangle meshes of the current frame corresponding to the object-side triangle meshes having a common side in step S108. In this case, the triangle mesh satisfying the object-side selection condition and the viewpoint-side selection condition is selected. When the triangle mesh for the three-point interpolation is selected in this manner, thereafter, the processing proceeds to step S110.

When it is determined in step S104 that the listening position is within the triangle mesh, the processing of step S107 is performed, or the processing of step S109 is performed, thereafter, the processing of step S110 is performed.

In step S110, the object position calculation unit 48 performs the three-point interpolation on the basis of the object absolute coordinate position information and the gain information of the triangle mesh selected for the three-point interpolation, that is, the selected three reference viewpoints, and generates the final object absolute coordinate position information and the gain information. The object position calculation unit 48 supplies the final object absolute coordinate position information and the gain information thus obtained to the polar coordinate transformation unit 49.

In step S111, the object position calculation unit 48 determines whether or not there is a next frame to be processed, that is, whether or not the reproduction of the content has ended.

In a case where it is determined in step S111 that there is a next frame, since the reproduction of the content has not yet been ended, the processing returns to step S101, and the above-described processing is repeated.

On the other hand, in a case where it is determined in step S111 that there is no next frame, the reproduction of the content has ended, and the viewpoint selection processing also ends.

As described above, the client 12 selects an appropriate triangle mesh on the basis of the viewpoint-side and object-side selection conditions, and performs the three-point interpolation. In this way, it is possible to suppress the occurrence of discontinuous movement of the object position and to realize higher quality acoustic reproduction.

According to the present technology described above, it is possible to realize reproduction at each reference viewpoint according to the intention of the content creator, instead of reproduction using a physical positional relationship with respect to a conventional fixed object arrangement in the movement of the listener in a free viewpoint space.

Furthermore, at an arbitrary listening position sandwiched between a plurality of reference viewpoints, the object position and the gain suitable for the arbitrary listening position can be generated by performing the interpolation processing on the basis of the object arrangement of the plurality of reference viewpoints. Therefore, the listener can move seamlessly between the reference viewpoints.

Moreover, in a case where the reference viewpoint overlaps the object position, it is possible to give the listener a feeling as if the listener became the object by lowering or muting the signal level of the object. Therefore, for example, a karaoke mode, a minus one performance mode, or the like can be realized, and a feeling that the listener itself joins in the content can be obtained.

In addition, in the interpolation processing of the reference viewpoint, in a case where there is a reference viewpoint to which the listener wants to bring closer, the sense of movement is weighted by applying the bias coefficient $\alpha$, so that the content can be reproduced with the object arrangement brought closer to the viewpoint that the listener prefers even when the listener moves.

Furthermore, in a case where there are four or more reference viewpoints, a triangle mesh can be configured by three reference viewpoints, and the three-point interpolation can be performed. In this case, since a plurality of triangle meshes can be configured, even when the listener freely moves in a region including the triangle meshes, that is, a region surrounded by all reference viewpoints, it is possible to realize content reproduction at an appropriate object position having an arbitrary position in the region as the listening position.

Moreover, according to the present technology, in a case of using transmission in a polar coordinate system, it is possible to realize audio reproduction of a free viewpoint space reflecting an intention of a content creator only by adding system configuration information to a conventional MPEG-H coding system.

<Configuration Example of Computer>

Incidentally, the series of processing described above can be executed by hardware and it can also be executed by software. In a case where the series of processing is executed by software, a program constituting the software is installed in a computer. Here, the computer includes a computer mounted in dedicated hardware, for example, a general-purpose a personal computer that can execute various functions by installing the various programs, or the like.

Figure 20:
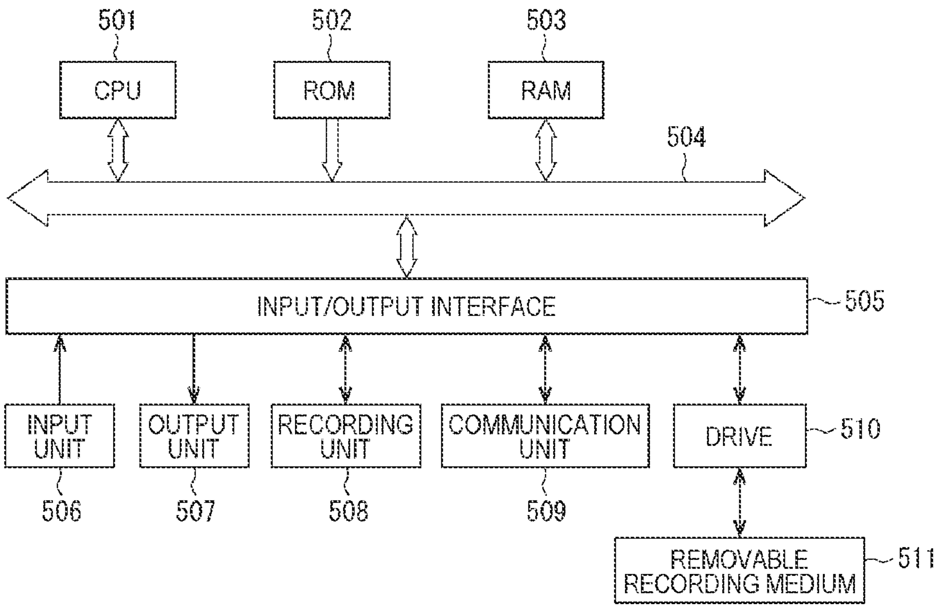
FIG. 20 is a diagram illustrating a configuration example of a computer.

FIG. 20 is a block diagram illustrating a configuration example of hardware of a computer in which the series of processing described above is executed by a program.

In the computer, a central processing unit (CPU) 501, a read only memory (ROM) 502, a random access memory (RAM) 503, are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured in the manner described above, the series of processing described above is performed, for example, such that the CPU 501 loads a program stored in the recording unit 508 into the RAM 503 via the input/output interface 505 and the bus 504 and executes the program.

The program to be executed by the computer (CPU 501) can be provided by being recorded on the removable recording medium 511, for example, as a package medium or the like. Furthermore, the program can be provided via a wired or wireless transmission medium such as a local area network, the Internet, or digital satellite broadcasting.

In the computer, the program can be installed on the recording unit 508 via the input/output interface 505 when the removable recording medium 511 is mounted on the drive 510. Furthermore, the program can be received by the communication unit 509 via a wired or wireless transmission medium and installed on the recording unit 508. In addition, the program can be pre-installed on the ROM 502 or the recording unit 508.

Note that the program executed by the computer may be a program that is processed in chronological order along the order described in the present description or may be a program that is processed in parallel or at a required timing, e.g., when call is carried out.

Furthermore, the embodiment of the present technology is not limited to the aforementioned embodiments, but various changes may be made within the scope not departing from the gist of the present technology.

For example, the present technology can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a single step includes a plurality of pieces of processing, the plurality of pieces of processing included in the single step can be executed by a single apparatus or can be shared and executed by a plurality of apparatuses.

Moreover, the present technology may be configured as below.

(1)

An information processing apparatus including:

a listener position information acquisition unit that acquires listener position information of a viewpoint of a listener;

a reference viewpoint information acquisition unit that acquires position information of a first reference viewpoint and object position information of an object at the first reference viewpoint, and position information of a second reference viewpoint and object position information of the object at the second reference viewpoint; and an object position calculation unit that calculates position information of the object at the viewpoint of the listener on the basis of the listener position information, the position information of the first reference viewpoint and the object position information at the first reference viewpoint, and the position information of the second reference viewpoint and the object position information at the second reference viewpoint.

(2)

The information processing apparatus according to (1), in which the first reference viewpoint and the second reference viewpoint are viewpoints set in advance by a content creator.

(3)

The information processing apparatus according to (1) or (2), in which the first reference viewpoint and the second reference viewpoint are viewpoints selected on the basis of the listener position information.

(4)

The information processing apparatus according to any one of (1) to (3), in which the object position information is information indicating a position expressed by polar coordinates or absolute coordinates, and the reference viewpoint information acquisition unit acquires gain information of the object at the first reference viewpoint and gain information of the object at the second reference viewpoint.

(5)

The information processing apparatus according to (4), in which the object position calculation unit calculates the position information of the object at the viewpoint of the listener by interpolation processing on the basis of the listener position information, the position information of the first reference viewpoint and the object position information at the first reference viewpoint, and the position information of the second reference viewpoint and the object position information at the second reference viewpoint.

(6)

The information processing apparatus according to (4) or (5), in which the object position calculation unit calculates gain information of the object at the viewpoint of the listener by interpolation processing on the basis of the listener position information, the position information of the first reference viewpoint and the gain information at the first reference viewpoint, and the position information of the second reference viewpoint and the gain information at the second reference viewpoint.

(7)

The information processing apparatus according to (5) or (6), in which the object position calculation unit calculates the position information or gain information of the object at the viewpoint of the listener by performing interpolation processing by weighting the object position information or the gain information at the first reference viewpoint.

(8)

The information processing apparatus according to any one of (1) to (4), in which the reference viewpoint information acquisition unit acquires the position information of the reference viewpoint and the object position information at the reference viewpoint for a plurality of, three or more, reference viewpoints including the first reference viewpoint and the second reference viewpoint, and the object position calculation unit calculates the position information of the object at the viewpoint of the listener by interpolation processing on the basis of the listener position information, the position information of each of the three reference viewpoints among the plurality of the reference viewpoints, and the object position information at each of the three reference viewpoints.

(9)

The information processing apparatus according to (8), in which the object position calculation unit calculates the gain information of the object at the viewpoint of the listener by interpolation processing on the basis of the listener position information, the position information of each of the three reference viewpoints, and gain information at each of the three reference viewpoints.

(10)

The information processing apparatus according to (9), in which the object position calculation unit calculates the position information or gain information of the object at the viewpoint of the listener by performing interpolation processing by weighting the object position information or the gain information at a predetermined reference viewpoint among the three reference viewpoints.

(11)

The information processing apparatus according to any one of (8) to (10), in which the object position calculation unit sets a region formed by arbitrary three reference viewpoints as a triangle mesh, and selects three reference viewpoints forming a triangle mesh satisfying a predetermined condition among a plurality of the triangular meshes as the three reference viewpoints to be used for interpolation processing.

(12)

The information processing apparatus according to (11), in which in a case where the viewpoint of the listener moves, the object position calculation unit sets a region formed by each of positions of the object indicated by each of the object position information at the three reference viewpoints forming the triangle mesh as an object triangle mesh, and selects the three reference viewpoints to be used for interpolation processing at the viewpoint after movement of the listener on the basis of a relationship between the object triangle mesh corresponding to the triangle mesh formed by the three reference viewpoints used for interpolation processing at the viewpoint before movement of the listener and the object triangle mesh corresponding to the triangle mesh including the viewpoint after movement of the listener.

(13)

The information processing apparatus according to (12), in which the object position calculation unit uses, for interpolation processing at the viewpoint after movement of the listener, three reference viewpoints forming the triangle mesh including the viewpoint after movement of the listener corresponding to the object triangle mesh having a side common to the object triangle mesh corresponding to the triangle mesh formed by the three reference viewpoints used for interpolation processing at the viewpoint before movement of the listener.

(14)

The information processing apparatus according to any one of (1) to (13), in which the object position calculation unit calculates the position information of the object at the viewpoint of the listener on the basis of the listener position information, the position information of the first reference viewpoint, the object position information at the first reference viewpoint, a listener direction information indicating a direction of a face of the listener set at the first reference viewpoint, the position information of the second reference viewpoint, the object position information at the second reference viewpoint, and the listener direction information at the second reference viewpoint.

(15)

The information processing apparatus according to (14), in which the reference viewpoint information acquisition unit acquires configuration information including the position information and the listener direction information of each of a plurality of reference viewpoints including the first reference viewpoint and the second reference viewpoint.

(16)

The information processing apparatus according to (15), in which the configuration information includes information indicating a number of the plurality of the reference viewpoints and information indicating a number of the objects.

(17)

An information processing method including, by an information processing apparatus:

acquiring listener position information of a viewpoint of a listener;

acquiring position information of a first reference viewpoint and object position information of an object at the first reference viewpoint, and position information of a second reference viewpoint and object position information of the object at the second reference viewpoint; and calculating position information of the object at the viewpoint of the listener on the basis of the listener position information, the position information of the first reference viewpoint and the object position information at the first reference viewpoint, and the position information of the second reference viewpoint and the object position information at the second reference viewpoint.

(18)

A program causing a computer to execute processing including the steps of:

acquiring listener position information of a viewpoint of a listener;

acquiring position information of a first reference viewpoint and object position information of an object at the first reference viewpoint, and position information of a second reference viewpoint and object position information of the object at the second reference viewpoint; and calculating position information of the object at the viewpoint of the listener on the basis of the listener position information, the position information of the first reference viewpoint and the object position information at the first reference viewpoint, and the position information of the second reference viewpoint and the object position information at the second reference viewpoint.

REFERENCE SIGNS LIST

11 Server
12 Client
21 Configuration information sending unit
22 Coded data sending unit
41 Listener position information acquisition unit
42 Viewpoint selection unit
44 Coded data acquisition unit
46 Coordinate transformation unit
47 Coordinate axis transformation processing unit
48 Object position calculation unit
49 Polar coordinate transformation unit
111 Communication unit
112 Position calculation unit
113 Rendering processing unit

The invention claimed is:

1. An information processing apparatus, comprising:

circuitry configured to:

acquire listener position information of a viewpoint of a listener who listens to a sound of content;

acquire first position information of a first reference viewpoint and first object position information of an object at the first reference viewpoint, and second position information of a second reference viewpoint and second object position information of the object at the second reference viewpoint;

calculate third position information of the object at the viewpoint of the listener based on the listener position information, the first position information of the first reference viewpoint and the first object position information at the first reference viewpoint, and the second position information of the second reference viewpoint and the second object position information at the second reference viewpoint;

execute a rendering process based on the calculated third position information of the object at the viewpoint of the listener; and generate reproduction audio data based on the rendering process to reproduce the sound of the content.

2. The information processing apparatus according to claim 1, wherein the first reference viewpoint and the second reference viewpoint are viewpoints set in advance by a content creator.

3. The information processing apparatus according to claim 1, wherein the first reference viewpoint and the second reference viewpoint are viewpoints selected based on the listener position information.

4. The information processing apparatus according to claim 1, wherein the first object position information and the second object position information are information that indicate a position expressed by one of polar coordinates or absolute coordinates, and the circuitry is further configured to acquire first gain information of the first-object at the first reference viewpoint and second gain information of the second object at the second reference viewpoint.

5. The information processing apparatus according to claim 4, wherein the circuitry is further configured to calculate the third position information of the object at the viewpoint of the listener based on interpolation process, and the interpolation process is based on the listener position information, the first position information of the first reference viewpoint and the first object position information at the first reference viewpoint, and the second position information of the second reference viewpoint and the second object position information at the second reference viewpoint.

6. The information processing apparatus according to claim 4, wherein the circuitry is further configured to calculate third gain information of the third object at the viewpoint of the listener based on interpolation process, and the interpolation process is based on the listener position information, the first position information of the first reference viewpoint and the first gain information at the first reference viewpoint, and the second position information of the second reference viewpoint and the second gain information at the second reference viewpoint.

7. The information processing apparatus according to claim 5, wherein the circuitry is further configured to calculate the third position information or third gain information of the object at the viewpoint of the listener based on the interpolation process, and the interpolation process is based on a weight given to the first object position information or the first gain information at the first reference viewpoint.

8. The information processing apparatus according to claim 1, wherein the circuitry is further configured to:

acquire position information of each reference viewpoint and object position information at the each reference viewpoint for three or more reference viewpoints, wherein the three or more reference viewpoints include the first reference viewpoint and the second reference viewpoint; and calculate the third position information of the third object at the viewpoint of the listener based on interpolation process, wherein the interpolation process is based on the listener position information, the position information of the each reference viewpoint of the three or more reference viewpoints, and the object position information at the each reference viewpoint of the three or more reference viewpoints.

9. The information processing apparatus according to claim 8, wherein the circuitry is further configured to calculate third gain information of the third object at the viewpoint of the listener based on the interpolation process, and the interpolation process is based on the listener position information, the position information of the each reference viewpoint of the three or more reference viewpoints, and gain information at the each reference viewpoint of the three or more reference viewpoints.

10. The information processing apparatus according to claim 9, wherein the circuitry is further configured to calculate the third position information or the third gain information of the object at the viewpoint of the listener based on the interpolation process, and the interpolation process is based on a weight given to fourth object position information or fourth gain information at a fourth reference viewpoint among the three or more reference viewpoints.

11. The information processing apparatus according to claim 8, wherein the circuitry is further configured to:

set a first region surrounded by arbitrary three reference viewpoints as a triangle mesh, wherein the three or more reference viewpoints include the arbitrary three reference viewpoints;

select a first triangle mesh among a plurality of triangular meshes, wherein the selected first triangle mesh satisfies a condition; and select first three reference viewpoints of the selected first triangle mesh as three reference viewpoints to be used for the interpolation process.

12. The information processing apparatus according to claim 11, wherein based on a movement of the viewpoint of the listener, the circuitry is further configured to:

set a second region surrounded by each of positions of an object indicated by each of object position information at the arbitrary three reference viewpoints of the triangle mesh as an object triangle mesh; and select the three reference viewpoints to be used for the interpolation process at a viewpoint after the movement of the listener, wherein the three reference viewpoints are selected based on a relationship between a first object triangle mesh and a second object triangle mesh, wherein the first object triangle mesh corresponds to the selected first triangle mesh of the selected first three reference viewpoints used for the interpolation process at a viewpoint before the movement of the listener, and the second object triangle mesh corresponds to a second triangle mesh that includes the viewpoint after the movement of the listener.

13. The information processing apparatus according to claim 12, wherein the circuitry is further configured to use, for the interpolation process at the viewpoint after the movement of the listener, second three reference viewpoints of the second triangle mesh that includes the viewpoint after the movement of the listener, and the second triangle mesh corresponds to the second object triangle mesh having a side common to the first object triangle mesh that corresponds to the selected first triangle mesh of the selected first three reference viewpoints used for the interpolation process at the viewpoint before the movement of the listener.

14. The information processing apparatus according to claim 1, wherein the circuitry is further configured to calculate the third position information of the object at the viewpoint of the listener based on the listener position information, the first position information of the first reference viewpoint, the first object position information at the first reference viewpoint, a first listener direction information that indicates a first direction of a face of the listener set at the first reference viewpoint, the second position information of the second reference viewpoint, the second object position information at the second reference viewpoint, and a second listener direction information that indicates a second direction of the face of the listener set at the second reference viewpoint.

15. The information processing apparatus according to claim 14, wherein the circuitry is further configured to acquire configuration information that includes the first position information and the first listener direction information of the first reference viewpoint, and the second position information and the second listener direction information of the second reference viewpoint.

16. The information processing apparatus according to claim 15, wherein the configuration information further includes information that indicates a number of a plurality of the reference viewpoints and information that indicates a number of objects, and the plurality of the reference viewpoints includes the first reference viewpoint and the second reference viewpoint.

17. An information processing method, comprising:

acquiring listener position information of a viewpoint of a listener who listens to a sound of content;

acquiring first position information of a first reference viewpoint and first object position information of an object at the first reference viewpoint, and second position information of a second reference viewpoint and second object position information of the object at the second reference viewpoint;

calculating third position information of the object at the viewpoint of the listener based on the listener position information, the first position information of the first reference viewpoint and the first object position information at the first reference viewpoint, and the second position information of the second reference viewpoint and the second object position information at the second reference viewpoint;

executing a rendering process based on the calculated third position information of the object at the viewpoint of the listener; and generating reproduction audio data based on the rendering process to reproduce the sound of the content.

18. A non-transitory computer-readable medium having stored thereon computer-executable instructions that, when executed by a computer, cause the computer to execute operations, the operations comprising:

acquiring listener position information of a viewpoint of a listener who listens to a sound of content;

acquiring first position information of a first reference viewpoint and first object position information of an object at the first reference viewpoint, and second position information of a second reference viewpoint and second object position information of the object at the second reference viewpoint;

calculating third position information of the object at the viewpoint of the listener based on the listener position information, the first position information of the first reference viewpoint and the first object position information at the first reference viewpoint, and the second position information of the second reference viewpoint and the second object position information at the second reference viewpoint;

executing a rendering process based on the calculated third position information of the object at the viewpoint of the listener; and generating reproduction audio data based on the rendering process to reproduce the sound of the content.

* * * * *